(12) United States Patent
Ward et al.

(10) Patent No.: US 10,300,647 B2
(45) Date of Patent: May 28, 2019

(54) SYSTEM AND METHOD FOR CONTINUOUS INJECTION MOLDING

(71) Applicant: iMFLUX Inc., Cincinnati, OH (US)

(72) Inventors: Coy Del Ward, Aurora, OH (US); Ralph Edwin Neufarth, Liberty Township, OH (US); Gene Michael Altonen, West Chester, OH (US); Chow-chi Huang, West Chester, OH (US); Charles John Berg, Jr., Wyoming, OH (US)

(73) Assignee: IMFLUX INC., Hamilton, OH (US)

(*) Notice: Subject to any disclaimer, the term of this patent is extended or adjusted under 35 U.S.C. 154(b) by 460 days.

(21) Appl. No.: 14/962,534

(22) Filed: Dec. 8, 2015

(65) Prior Publication Data

US 2017/0157824 A1 Jun. 8, 2017

(51) Int. Cl.
| | | |
|---|---|---|
| *B29C 45/06* | (2006.01) | |
| *B29C 45/77* | (2006.01) | |
| *B29C 45/04* | (2006.01) | |
| *B29C 45/18* | (2006.01) | |
| *B29C 45/73* | (2006.01) | |
| *B29C 45/40* | (2006.01) | |
| *B29C 45/26* | (2006.01) | |
| *B29K 101/12* | (2006.01) | |

(52) U.S. Cl.
CPC ............ *B29C 45/77* (2013.01); *B29C 45/045* (2013.01); *B29C 45/18* (2013.01); *B29C 45/2681* (2013.01); *B29C 45/40* (2013.01); *B29C 45/73* (2013.01); *B29C 2945/76006* (2013.01); *B29C 2945/76498* (2013.01); *B29C 2945/76545* (2013.01); *B29K 2101/12* (2013.01)

(58) Field of Classification Search
CPC ..... B29C 45/77; B29C 45/2681; B29C 45/40; B29C 45/73; B29C 45/045; B29C 45/18
See application file for complete search history.

(56) References Cited

U.S. PATENT DOCUMENTS

| | | | |
|---|---|---|---|
| 3,759,648 A | | 9/1973 | Hunkar |
| 4,242,073 A | * | 12/1980 | Tsuchiya ............... B29C 45/125 425/149 |
| 4,386,043 A | | 5/1983 | Takeshima |

(Continued)

FOREIGN PATENT DOCUMENTS

| | | |
|---|---|---|
| CN | 105058695 A | 11/2015 |
| EP | 2481547 A1 | 8/2012 |
| WO | WO-2015/077262 A1 | 5/2015 |
| WO | WO-2016/064394 A1 | 4/2016 |

OTHER PUBLICATIONS

International Search Report and Written Opinion, International Application No. PCT/US2015/064361, dated Aug. 31, 2016.

(Continued)

*Primary Examiner* — Galen H Hauth
(74) *Attorney, Agent, or Firm* — Marshall, Gerstein & Borun LLP

(57) ABSTRACT

A carousel-like continuous molding system includes an arrangement of inclined feed channels. Each of the feed channels has a controllable valve therein positioned upstream of an inlet to an associated mold cavity. The valve is controllable so that adjustments may be made in real time to achieve or maintain delivery of molten polymeric material to the mold cavity at constant pressure.

12 Claims, 11 Drawing Sheets

(56) References Cited

U.S. PATENT DOCUMENTS

| | | | |
|---|---|---|---|
| 4,461,738 A | | 7/1984 | Russell |
| 4,470,796 A | | 9/1984 | Stroup et al. |
| 4,828,778 A | | 5/1989 | Gelsomini et al. |
| 5,028,226 A | * | 7/1991 | De'ath ................ B29C 45/1607 |
| | | | 425/130 |
| 6,042,754 A | | 3/2000 | Yang et al. |
| 6,630,090 B1 | | 10/2003 | Nagaoka |
| 6,755,638 B2 | | 6/2004 | Chen et al. |
| 2002/0084542 A1 | | 7/2002 | Suzuki |
| 2005/0139971 A1 | | 6/2005 | Minato |
| 2008/0251974 A1 | * | 10/2008 | Simone ................... B29C 45/06 |
| | | | 264/328.11 |
| 2009/0108497 A1 | | 4/2009 | Chaslin |
| 2011/0045250 A1 | | 2/2011 | De Zen |
| 2012/0231110 A1 | * | 9/2012 | Ai .......................... B29C 45/06 |
| | | | 425/547 |
| 2015/0374115 A1 | | 12/2015 | Wilson et al. |
| 2016/0158980 A1 | | 6/2016 | Fitzpatrick |
| 2016/0158981 A1 | | 6/2016 | Fitzpatrick |
| 2016/0158985 A1 | | 6/2016 | Fitzpatrick |
| 2016/0361743 A1 | | 12/2016 | Vielhaber |
| 2017/0128995 A1 | | 5/2017 | Tsay |
| 2017/0157820 A1 | | 6/2017 | Ward et al. |

OTHER PUBLICATIONS

Taiwan Patent Application No. 104141220, Office Action with Search Report, dated Feb. 13, 2019.

\* cited by examiner

SYSTEM AND METHOD FOR CONTINUOUS INJECTION MOLDING

FIELD OF THE INVENTION

This application relates generally to injection molding systems and, more specifically, to a system and method for continuously feeding molten polymeric materials to a plurality of mold cavities that rotate about a central nozzle disposed at a higher elevation than inlets to the mold cavities.

BACKGROUND OF THE INVENTION

The injection molding process used predominantly in industry today involves an intermittent process where: 1) a "shot" of polymer is melted; 2) two cooled mold halves are clamped together under a clamping force; 3) the "shot" of molten polymer is forced into the cooled mold cavity; 4) the polymer cools to a solid state; 5) the mold cavity opens; 6) the molded part is removed. This process is repeated to form multiple parts using the same mold cavity. Furthermore, this same process is used to produce multiple parts simultaneously, where multiple mold cavities are filled at the same time, in so-called multi-cavity injection molding systems.

This intermittent process has numerous limitations, including: 1) all processes occur in a sequential fashion, which lengthens the time required to mold a part since each step must be completed before the next step can begin; 2) to produce large quantities of parts it is necessary to have many mold cavities filled simultaneously—this requires very large equipment to hold the mold closed since the clamp tonnage must hold multiple mold cavities closed all at the same time, and the molds are very large to accommodate the multiple mold cavities.

One approach to address these issues is to "compression mold" molded articles. This approach involves: 1) extruding molten polymer; 2) trimming a "plug" of extruded polymer to a predetermined length (to achieve a target volume of polymer); 3) depositing the "plug" into a bottom mold cavity; and 4) compressing an upper mold half in to a bottom mold half to form a molded part. This approach can be accomplished on a continuous rotating platform which enables each step to be accomplished simultaneously, and results in very high production rates and lower costs. However, there are numerous trade-offs. First, the polymer "plug" freezes immediately when contacting the cooled bottom mold half—this results in a noticeable matte or rough surface texture on the molded part (an undesirable quality defect). Second, the molds must be very simple in design to enable the part to be molded by the compressive forces as the upper mold half approaches the bottom mold half—this dramatically limits the part designs that are possible using this molding technique.

An alternate approach is to continually feed the polymer to a plurality of mold cavities arranged in a carousel fashion about a central polymer source. In existing continuous injection molding systems of this nature that have been proposed or put into practice, it is understood that the mold cavities are disposed about the central polymer source in a planar, hub-and-spokes fashion, with the polymer source outlet or nozzle being in the same plane as the inlet of each of the mold cavities. One drawback of this arrangement is the large footprint of manufacturing floor space required to accommodate all of the mold cavities. Another drawback is the amount of energy necessary to propagate the polymer along horizontally-extending feed channels that connect the nozzle and the mold cavities. An additional drawback is the lack of ability to make real-time adjustments to melt pressure. In at least one prior disclosure of a carousel-type continuous molding system, the system had a valve gate actuator for positioning a valve pin that controllably connected the molding cavity to a shooting pot. The valve gate was operated according to a valve gate cam profile for actuation of the valve pin. Because the valve's actuation is dependent upon a cam track, the valve position is dictated by the location of a mold position as it rotates about the carousel. As such, there is no ability to adjust the melt flow to increase or decrease pressure. The only variable determining the rate and pressure by which melt flows into a given mold cavity is the extent to which the valve is open or closed, but with no ability to make fine adjustments at the location of the valve, any pressure adjustments that may be needed would have to be accomplished by adjusting the rate of output of an extruder or other source of molten polymeric material.

SUMMARY OF THE INVENTION

A new approach has been discovered that involves extruding polymer through a rotating feeder element. This is enabled by the use of a newly discovered substantially constant pressure filling process, that is suitable to produce a high quality part even at very low filling pressures. The process involves: 1) supplying, by some motivation such as extrusion, a continuous flow of the molten polymeric material into a rotating feeder element; 2) metering the flow of molten polymeric material into the mold cavity through a metering plate, metering gate, or controllable valve; 3) cooling the polymer in the mold cavity; 4) ejecting the part from the mold cavity; and 5) closing the mold cavity to prepare the mold cavity to receive another "shot" of molten polymeric material. The process is repeated on a continuous basis.

Each of the feed channels of the continuous injection molding system of the present disclosure is arranged at an incline, as a nozzle of the source of molten polymeric material is located at a first elevation that is higher than a second elevation of the inlet of each of the mold cavities.

In one embodiment, the nozzle of the source of molten polymeric material is centrally disposed, and mold cavities are arranged in a rotating carousel-type fashion about the nozzle. A plurality of inclined feed channels or feed lines extend downwardly from the nozzle and provide fluid communication for the continuously-fed molten polymeric material to the interior of the mold cavities. By providing the nozzle at a higher elevation than the inlets of the mold cavities, the mold cavities can be arranged in closer radial proximity to the nozzle, and therefore permit the overall system to occupy a smaller overall footprint, compared to a conventional planar continuous molding system.

The continuous molding system of the present disclosure is particularly suited to operation at low, substantially constant pressure while each mold cavity is filled. The present disclosure also recognizes that there may be a desire to make minor adjustments to pressure of molten polymeric material entering individual mold cavities based on real-time measurements. The inclined feed channels may be provided with metering gates or controllable valves, such as ball valves, needle valves, or metering plates, that can be actuated in a manner that results in an increase in pressure of molten polymeric material delivered to the inlet of the mold cavity associated with that inclined feed channel, while maintaining the delivery of molten polymeric material at substantially constant pressure to the inlets of the mold cavities in fluid communication with the inclined feed channels upstream (among the plurality of closed mold cavities) of the mold cavity.

A substantially constant pressure injection molding system enables the packing phase of injection molding to occur simultaneously with, and at the same (or substantially the same) pressure as the filling phase of injection molding, favorably reducing cycle time and avoiding the need to increase pressure at the end of fill to avoid detrimental effects due to shrinkage upon cooling of injection molded products. However, it is still desirable, even in a substantially constant pressure multi-cavity injection molding system, to be able to have the ability to make finite adjustments to pressures of molten polymeric material introduced to the mold cavities. Some injection molding systems control pressure by regulating the rate of rotation of a extruder system upstream of a nozzle and manifold or feed system. A drawback of such systems is that there is an inherent lag between a sensed condition (e.g., pressure, temperature, viscosity, or flow rate) at a particular location, such as at a gate, a mold cavity inlet, or at locations along an interior of a mold cavity, and a pressure adjustment because it takes some time, even assuming the controller is able to instantaneously process a signal from a sensor indicative of a sensed condition warranting a change in pressure and instruct the extruder system to change its velocity to compensate, it takes some time before the resulting pressure change is realized at the sensed location, due to the time it takes molten polymeric material to travel distance from the extruder system to the sensed location. U.S. patent application Ser. No. 13/476,047, entitled "Alternative Pressure Control for a Low Constant Pressure Injection Molding Apparatus," the entirety of which is incorporated herein by reference, discloses and describes the use of an active, closed loop controller to regulate and achieve a substantially constant pressure of molten polymeric material, as well as other pressure regulating devices to maintain a substantially constant melt pressure. For instance, a pressure relief valve having a set point lower than the melt pressure on a melt holder side of the pressure relief valve is disclosed that vents out a portion of molten polymeric material through a pressure relief outlet when the pressure of the molten polymeric material exceeds a set point of the pressure relief valve.

With the ability to actuate the controllable valves of the individual inclined feed channels of the present disclosure, the continuous molding system facilitates more-instantaneous corrections or pressure adjustments as compared to closed loop controllers that regulate the rate of rotation of a extruder system of an injection mold system, since those pressure adjustments are being made by way of a valve disposed immediately upstream of an inlet of the mold cavity. In this respect, the controllable valves of the individual inclined feed channels of the continuous molding system of the present disclosure offer a pressure adjustment very close to the inlet of the mold cavities, similar to a benefit realized by the pressure relief valves of U.S. application Ser. No. 13/476,047. Additionally, the individually-actuable controllable valves offer greater flexibility in mold operation, as they are not limited to a single set point, but rather, can be variably opened or closed to desired extents in order to make real-time adjustments to pressure.

A extruder system of the continuous molding system can add a pressure boost if needed in addition to the pressure created by rotation. Additionally, a step filling process using valving can provide better injection control. The on/off (valve control) can be at the extruder, at the nozzle, or at each cavity.

In continuous injection molding, each cavity can be fed through a rotating feed system. Within that feed system, each feed line can be regulated by a hydraulic or pneumatic valve. Such a rotating feed system has the ability to restrict or shut-off. The controllable valve may be used to increase or decrease plastic pressure as it enters the individual mold cavity. The valve may be located in the feed channel, or at the gate (or mold opening) in fluid communication with the feed channel. The controllable valve may be actuated electrically, pneumatically, hydraulically, or by any other suitable means. An electromagnetic engagement, or disengagement, of the controllable valve may also be preferably employed to allow remote control of the valve mechanism disengagement.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

During a traditional (conventional) injection molding cycle, there is an initial plasticizing phase during which granular pellets of polymeric resin material are fed from a hopper into a barrel of an injection molding system. A piston, typically in the form of a screw, retracts away from a nozzle end of the barrel and heaters operate to melt the polymeric resin material, creating a "shot" of molten polymeric material in front of the screw. Then, during an injection phase, hydraulic pressure is used to rotate and advance the screw forward, toward the nozzle end of the barrel, thereby forcing the molten polymeric material through the nozzle and into a runner (or, in the case of a multi-cavity mold system, a system of runners or a manifold), and ultimately into the mold cavity or cavities. The mold cavity or cavities are filled and packed with the polymeric material, with a high level of clamping force used to maintain a closed engagement of the mold cavity walls even against the injection pressure imparted by the screw. Once the mold cavities have been filled and packed, a cooling phase takes place during which the walls of the mold(s) are cooled (such as by passing cooling fluid through cooling channels within the mold walls) until the molded part is cooled to its ejection temperature.

Figure 1:
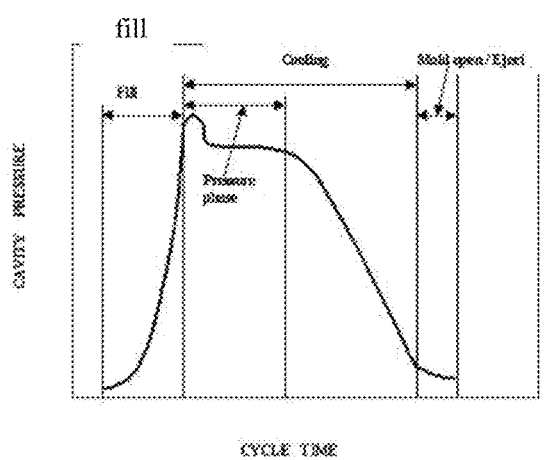
FIG. 1 is a graph illustrating the cavity pressure plotted against cycle time for a conventional injection molding system.

A graph depicting the pressure cycle for a conventional injection molding system is illustrated in FIG. 1. As illustrated therein, there is an aggressive increase in pressure during the fill stage (the steep, positive-sloped portion of the curve at the left portion of the plot). This is followed by a short spike in pressure, reflecting a fill-and-pack stage just at the end of fill as the cooling phase commences.

Embodiments of the present disclosure can use any and all embodiments of materials, structures, and/or features, methods, and materials for injection molding at substantially constant pressure as disclosed in the following US patent applications:

U.S. patent application Ser. No. 13/476,045, entitled Apparatus and Method for Injection Molding at Low Constant Pressure (Applicant's ref. 12127), U.S. patent application Ser. No. 13/601,307, entitled Apparatus and Method for Injection Molding at Low Constant Pressure (Applicant's ref. 12127D), U.S. patent application Ser. No. 13/476,047, entitled Alternative Pressure Control for a Low Constant Pressure Injection Molding Apparatus (Applicant's ref. 12128), U.S. patent application Ser. No. 13/774,571, entitled Injection Molding System Having Simplified Cooling (Applicant's ref. 12129), U.S. patent application Ser. No. 13/476,073, entitled Non-Naturally Balanced Feed System for an Injection Molding Apparatus (Applicant's ref. 12130), Ser. No. 13/476,197, entitled Method for Injection Molding at Low, Substantially Constant Pressure (Applicant's Ref. 12131Q), Ser. No. 13/476,178, entitled Method for Injection Molding at Low, Substantially Constant Pressure (Applicant's Ref. 12132Q), U.S. patent application Ser. No. 13/601,338, entitled Method for Injection Molding at Low, Substantially Constant Pressure (Applicant's Ref.: 12132DQ), U.S. patent application Ser. No. 13/774,692, entitled High Thermal Conductivity Co-Injection Molding System (Applicant's Ref.: 12361), U.S. patent application Ser. No. 13/601,359, entitled Injection Mold Having A Simplified Evaporative Cooling System or a Simplified Cooling System With Exotic Cooling Fluids (Applicant's Ref.: 12453), U.S. patent application Ser. No. 13/765,425, entitled Injection Mold Having A Simplified Evaporative Cooling System or a Simplified Cooling System With Exotic Cooling Fluids (Applicant's Ref.: 12453M), U.S. patent application Ser. No. 13/476,584, entitled Method and Apparatus for Substantially Constant Pressure Injection Molding of Thinwall Parts (Applicant's Ref.: 12487), U.S. patent application Ser. No. 13/601,514, entitled Method and Apparatus for Substantially Constant Pressure Injection Molding of Thinwall Parts (Applicant's Ref.: 12487D), U.S. patent application Ser. No. 13/672,246, entitled Injection Mold with Failsafe Mechanism (Applicant's Ref.: 12657), U.S. patent application Ser. No. 13/682,456, entitled A Method for Operating A High Productivity Injection Molding Machine (Applicant's Ref.: 12673R), U.S. Provisional Appl. No. 61/728,764, entitled Methods of Molding Compositions of Thermoplastic Polymer and Hydrogenated Castor Oil (Applicant's Ref.: 12674P), U.S. Provisional Appl. No. 61/729,028, entitled Reduced Size Runner for an Injection Mold System.

Figure 2:
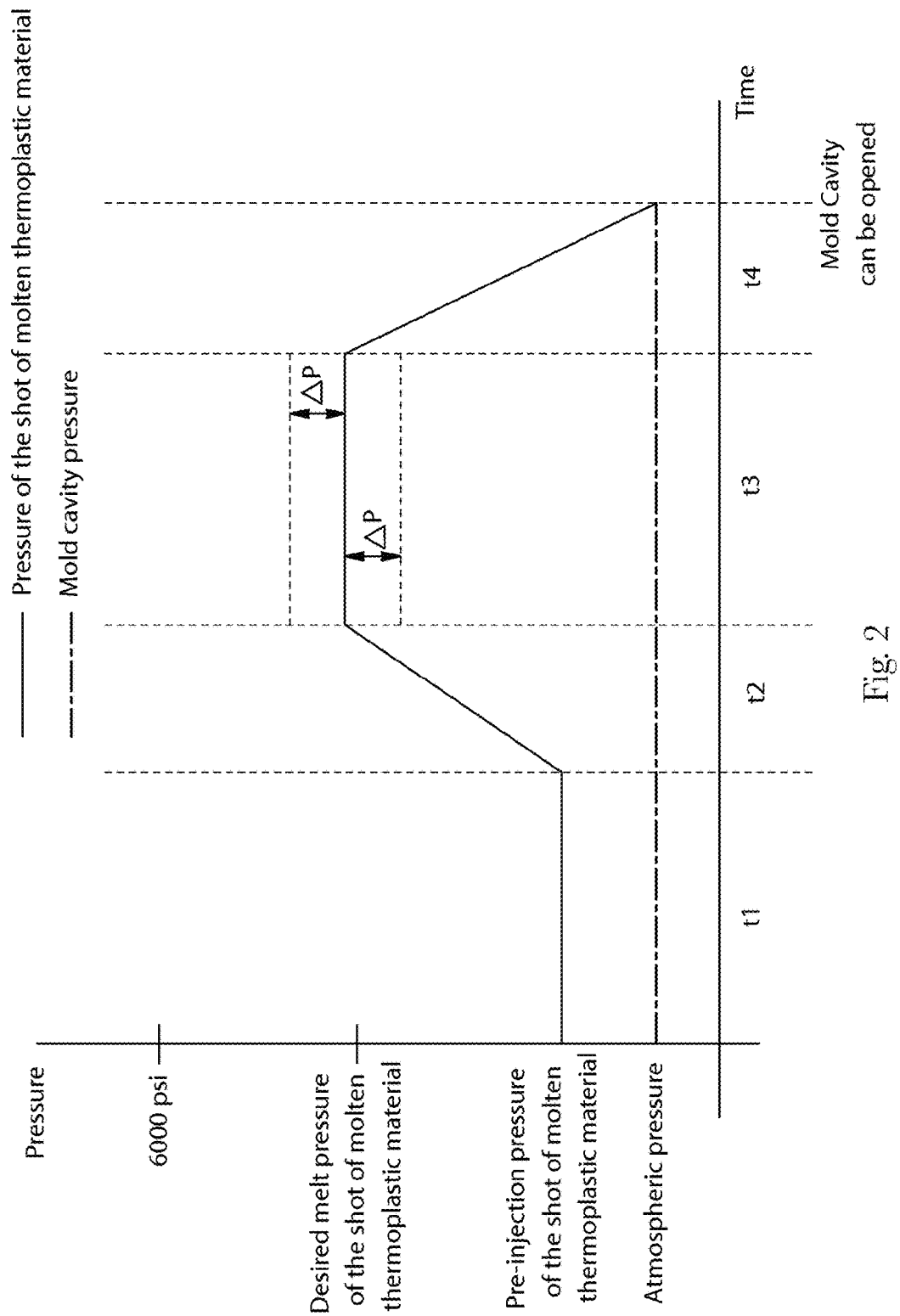
FIG. 2 is a schematic illustration of a pressure profile for a method of discontinuous (intermittent) injection molding at low, substantially constant pressure.
Figure 3:
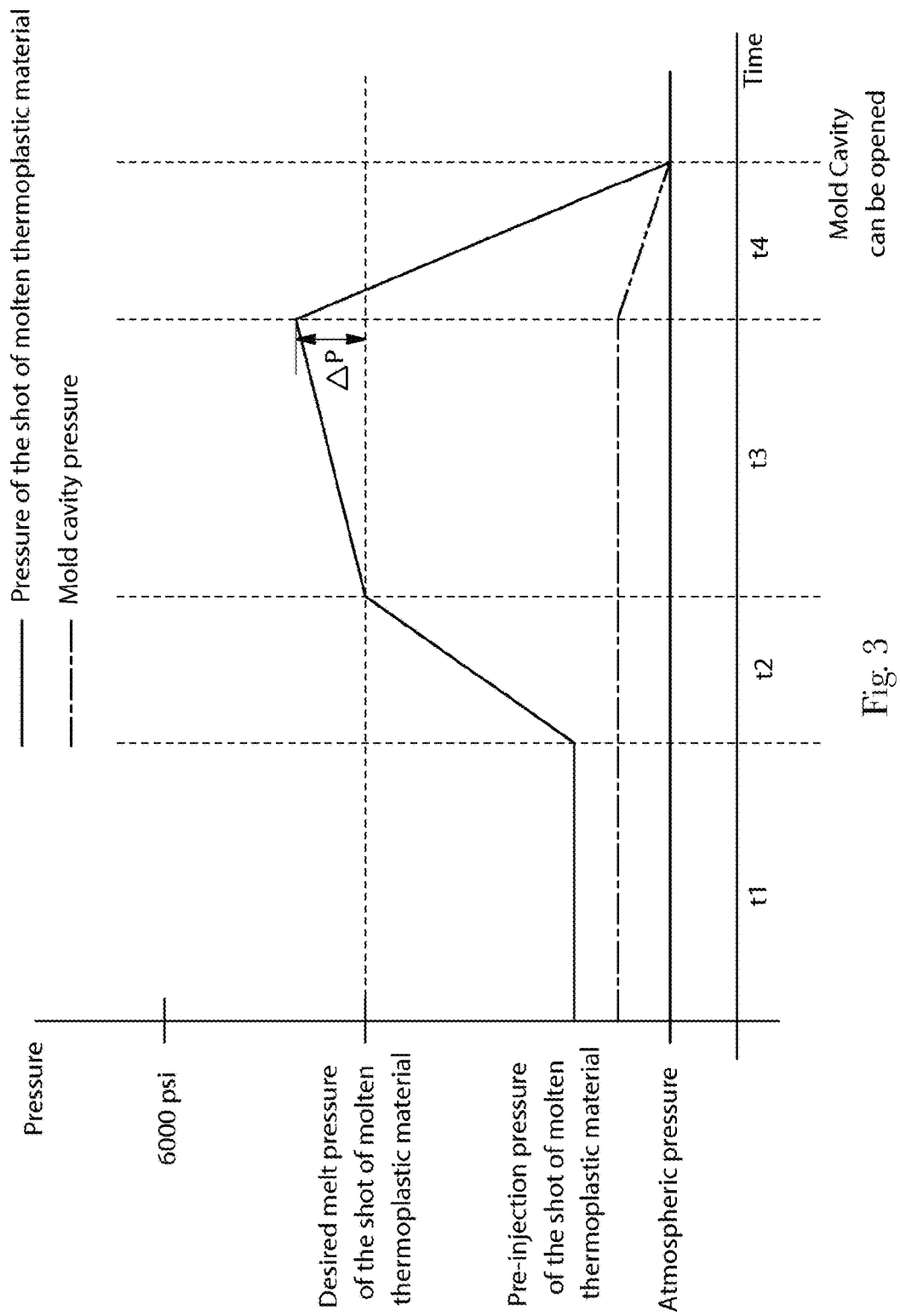
FIG. 3 is a schematic illustration of a second pressure profile for a method of discontinuous (intermittent) injection molding at low, substantially constant pressure.
Figure 4:
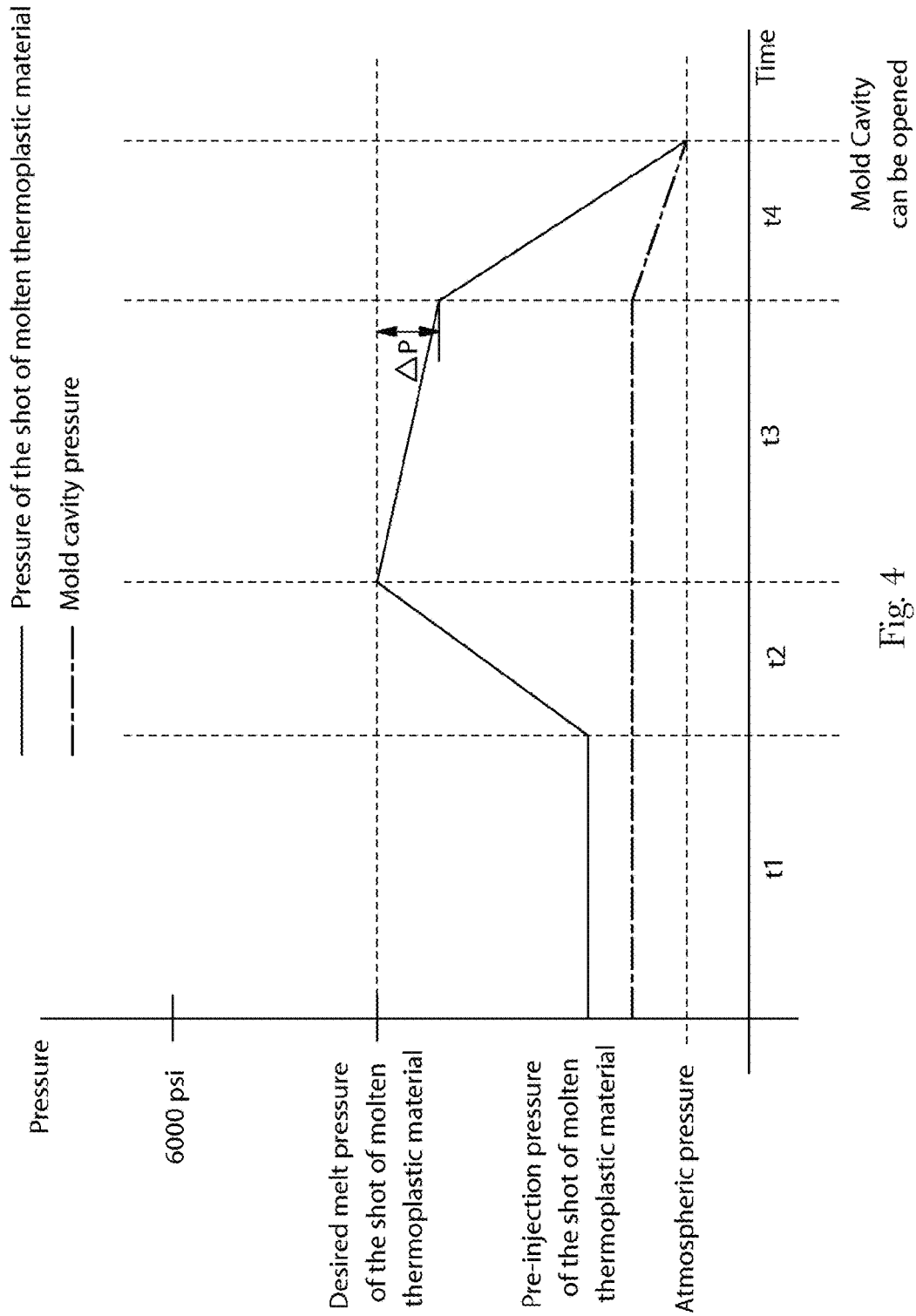
FIG. 4 is a schematic illustration of a third pressure profile for a method of discontinuous (intermittent) injection molding at low, substantially constant pressure.

Referring to FIG. 2, at time t1, which is prior to injection, the shot comprising molten thermoplastic material has a pre-injection pressure. As used herein, the pre-injection pressure of the shot comprising molten thermoplastic material refers to the pressure of the thermoplastic material after it has been heated into a molten state in the heated barrel and prepared into the shot, and just prior to injection of the shot comprising the molten thermoplastic material into the mold cavity or a runner or feed system in fluid communication with the nozzle and the mold cavity. The pre-injection pressure of the shot comprising molten thermoplastic material can optionally be unequal to the pressure of the mold cavity prior to injection. In one embodiment, prior to injection the mold cavity can be at atmospheric pressure, for example, as shown in FIGS. 2 and 4. In another embodiment, the mold cavity can have a slight positive pressure, as shown in FIG. 3. In yet another embodiment a vacuum can be induced in the mold cavity.

Figure 6:
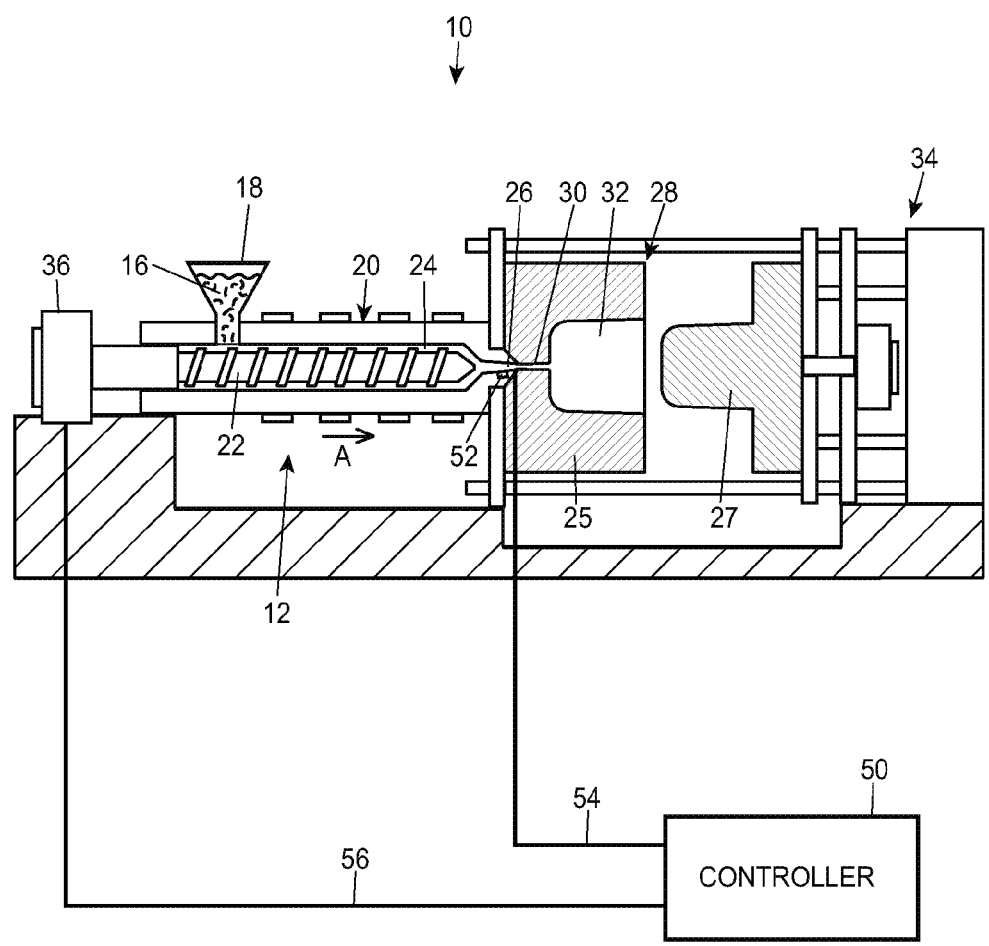
FIG. 6 illustrates a diagrammatic front view of a high velocity discontinuous (intermittent) injection molding machine.

As illustrated in FIG. 2, upon injection into the mold cavity during t2, the pressure of the shot comprising molten thermoplastic material increases to a melt pressure that is greater than the pre-injection pressure of the shot comprising molten thermoplastic material. Referring to FIG. 6, for example, injection of the shot comprising molten thermoplastic material can include translating the extruder system 22 in the direction of arrow A in FIG. 6, toward the nozzle 26, to force the shot comprising molten thermal plastic material 24 through the nozzle 26 and into the mold cavity 32. In various embodiments, the shot comprising molten thermoplastic material 24 may be injected into the mold cavity 32 of a mold 28 through a gate 30, which directs the flow of the molten thermoplastic material 24 to the mold cavity 32. The mold cavity 32 can be formed, for example, between first and second mold parts 25, 27 of the mold 28. The first and second mold parts 25, 27 of the mold 28 can be held together under pressure by a press 34.

Referring again to FIG. 2, substantially the entire mold cavity or the entire mold cavity is filled with the shot comprising molten thermoplastic materials at time t3. The melt pressure is maintained at a substantially constant pressure of less than 15,000 psi during filling of substantially the entire mold cavity. As used herein, the term "substantially constant pressure" refers to a pressure that does not fluctuate upwardly or downwardly from the desired melt pressure more than 30% of the desired melt pressure during filling of substantially the entire mold cavity with the shot comprising molten thermoplastic material. For example, the substantially constant pressure can fluctuate (either as an increase or decrease) from the melt pressure about 0% to about 30%, about 2% to about 25%, about 4% to about 20%, about 6% to about 15%, and about 8% to about 10%. Other suitable fluctuation amounts includes about 0, 2, 4, 6, 8, 10, 12, 14, 16, 18, 20, 22, 24, 26, 28, and 30%. The fluctuation is illustrated in FIG. 2 as a ΔP from the desired melt pressure. Without intending to be bound by theory, it is believed that maintaining a substantially constant pressure as defined herein can prevent hesitation of the melt front as the molten thermoplastic material flows into the mold cavity. Such dynamic flow conditions can advantageously allow the shot comprising molten thermoplastic material to maintain uniform flow and packing conditions to the last point of fill of the mold without freezing or other disruption in the molten material. As illustrated in FIGS. 3 and 4, the melt pressure during filling of substantially the entire mold cavity can increase or decrease, respectively, for example, at a constant rate, and be considered substantially constant so long as the maximum increase or decrease in the melt pressure during filling of substantially the entire mold cavity is no greater than the 30% of the desired melt pressure. Again, this fluctuation is illustrated in FIGS. 3 and 4 as a ΔP from the desired melt pressure.

Figure 5:
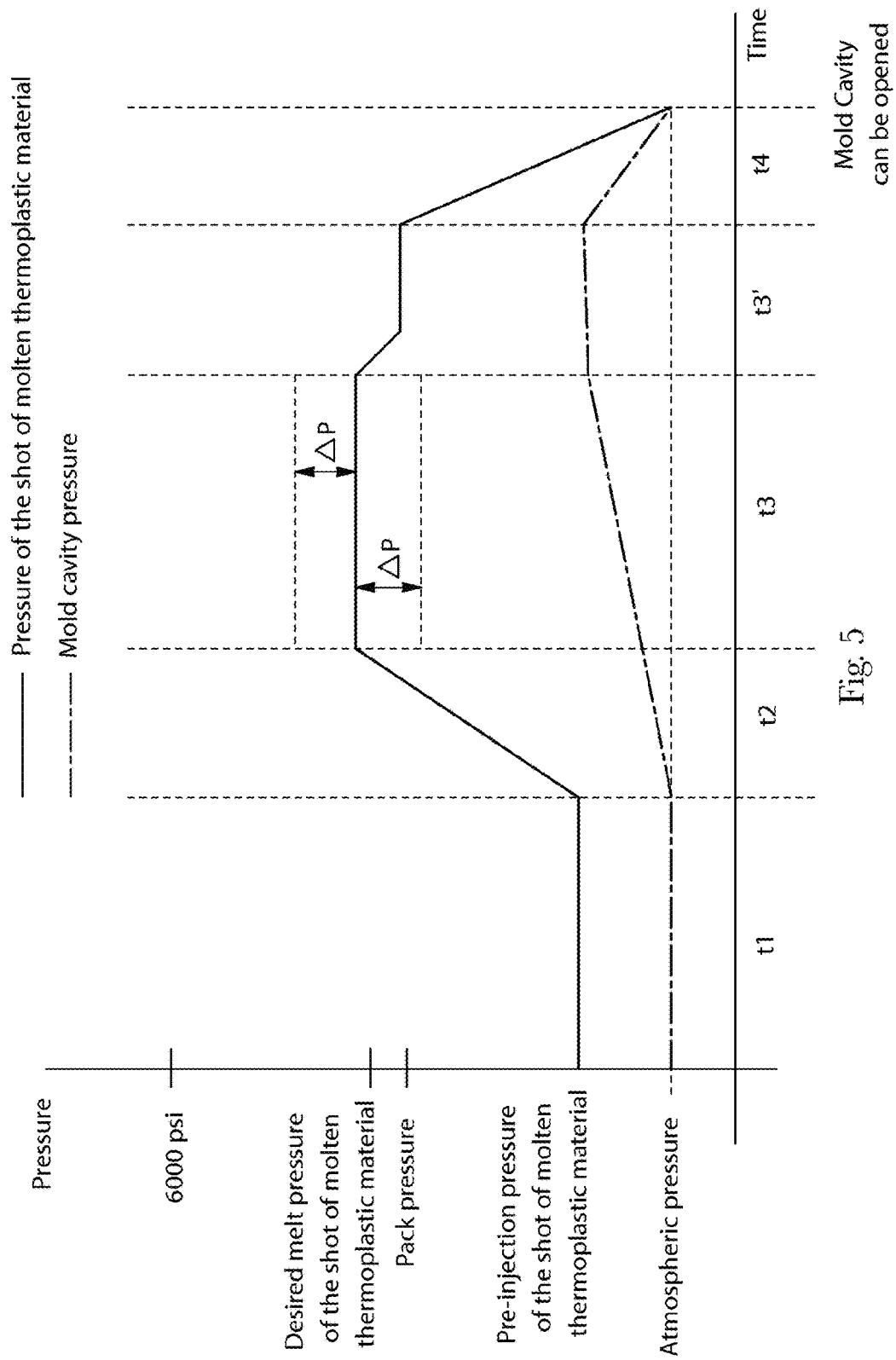
FIG. 5 is a schematic illustration of a fourth pressure profile for a method of discontinuous (intermittent) injection molding at low, substantially constant pressure.

Referring to FIG. 5 and discussed in detail below, once substantially the entire mold cavity is filled (at time t3), the melt pressure can be reduced to a pack pressure to fill the remaining portion of the mold cavity (at time t3'). The pack pressure can be maintained substantially constant until the entire mold cavity is filled.

A sensor may be located near the end of fill in the mold cavity. This sensor may provide an indication of when the mold front is approaching the end of fill in the cavity. The sensor may sense pressure, temperature, optically, or other means of identifying the presence of the polymer. When pressure is measured by the sensor, this measure can be used to communicate with the central control unit to provide a target "packing pressure" for the molded component. The signal generated by the sensor can be used to control the molding process, such that variations in material viscosity, mold temperatures, melt temperatures, and other variations influencing filling rate, can be adjusted for by the central control unit. These adjustments can be made immediately during the molding cycle, or corrections can be made in subsequent cycles. Furthermore, several readings can be averaged over a number of cycles then used to make adjustments to the molding process by the central control unit. In this way, the current injection cycle can be corrected based on measurements occurring during one or more cycles at an earlier point in time. In one embodiment, sensor readings can be averaged over many cycles so as to achieve process consistency.

Once the mold cavity is completely filled, the melt pressure and the mold cavity pressure, if necessary, are reduced to atmospheric pressure at time t4 and the mold cavity can be opened. During this time, the extruder system 22 stops traveling forward. Advantageously, the low, substantially constant pressure conditions allow the shot comprising molten thermoplastic material to cool rapidly inside the mold, which, in various embodiments, can occur substantially simultaneously with venting of the melt pressure and the mold cavity to atmospheric pressure. Thus, the injection molded part can be ejected from the mold quickly after filling of the mold cavity with the shot comprising molten thermoplastic material.

As used herein, the term "inlet" of a mold cavity refers to a passageway that permits ingress, introduction, or entry of molten polymeric material into the mold cavity, which passageway is in fluid communication with the cavity. An inlet may take the form of a gate, a sprue, a valve, an end of a runner or manifold, or a terminal end of a feed channel or feed line.

As used herein, the term "melt" refers to molten material, which is typically a polymeric material, transported through a feed system into mold cavities, where it solidifies into finished parts.

Melt Pressure

As used herein, the term "melt pressure" refers to a pressure of a shot comprising molten thermoplastic material as it is injected into and fills a mold cavity of a molding apparatus. During filling of substantially the entire mold cavity, the melt pressure of the shot comprising molten thermoplastic material is maintained substantially constant.

As used herein, "motivation" refers to a means by which the melt is made to move from a press nozzle into part cavities. This may be achieved through either positive displacement or positive pressure means, or a combination thereof.

The term "valve" refers to a mechanism that regulates the mass flow of melt through a point in a feed system, including the ability to completely block flow. A valve may take the form of a rotatable ball valve, gate valve, butterfly valve, needle valve, iris-type valve, flap valve, reed valve, flapper valve, diaphragm valve, disc valve, check (ball-type) valve, check (ring-type) valve, duckbill valves, or some other type of valve.

As described above, a "substantially constant pressure" refers to a pressure that does not fluctuate upwardly or downwardly from the desired melt pressure more than 30% of the desired melt pressure during filling of substantially the entire mold cavity with the shot comprising molten thermoplastic material. For example, the substantially constant pressure can fluctuate (either as an increase or decrease) from the melt pressure about 0% to about 30%, about 2% to about 25%, about 4% to about 20%, about 6% to about 15%, and about 8% to about 10%. Other suitable fluctuation amounts includes about 0, 2, 4, 6, 8, 10, 12, 14, 16, 18, 20, 22, 24, 26, 28, and 30%. The fluctuation is illustrated in FIG. 2 as a ΔP from the desired melt pressure. Referring to FIGS. 3 and 4, the melt pressure during filling of substantially the entire mold cavity can increase or decrease, respectively, for example, at a constant rate, and be considered substantially constant so long as the maximum increase or decrease in the melt pressure during filling of substantially the entire mold cavity is no greater than the 30% of the desired melt pressure. Again, this fluctuation is illustrated in FIGS. 3 and 4 as a ΔP from the desired melt pressure. In yet another embodiment, the melt pressure during filling of substantially the entire mold cavity can increase over a portion of time t3 and then decrease over a remaining portion of time t3. This fluctuation will be considered a substantially constant pressure so long as the maximum increase or decrease in the melt pressure during filing is less than 30% of the desired melt pressure.

The melt pressure of the shot comprising thermoplastic material upon injection into the mold cavity can be measured using, for example, a pressure transducer disposed at the injection point. As used herein, the "injection point" is the location in the molding apparatus where the shot comprising molten thermoplastic material enters the mold cavity. For example, for a molding apparatus having a single mold cavity coupled to a nozzle, the injection point can be at or adjacent to the nozzle. Alternatively, for a molding apparatus having a plurality of mold cavities and a runner system for transporting the molten thermoplastic material from the nozzle to each of the mold cavities, the injection points can be the points of contact between the runner system and each of the individual mold cavities. The shot comprising molten thermoplastic material is maintained at the substantially constant melt pressure as it is transported through the runner system. In general, the runner system is a heated runner system that maintains the melt temperature of the shot comprising molten thermoplastic material as it is transported to the mold cavities.

The melt pressure of the shot comprising thermoplastic material (i.e., molten polymeric material) during filling of substantially the entire mold cavity can be maintained, for example, by measuring the melt pressure using a pressure transducer disposed at the nozzle and maintaining a constant pressure at the nozzle upon injection into the mold cavity. In another embodiment, the melt pressure of the shot comprising thermoplastic material during filing of substantially the entire mold cavity can be measured using a pressure transducer disposed in the mold cavity opposite the gate.

The cavity percent fill is defined as the % of the cavity that is filled on a volumetric basis. Thus, if a cavity is 95% filled, then the total volume of the mold cavity that is filled is 95% of the total volumetric capacity of the mold cavity. Substantially the entire mold cavity is filled when at least at least 70%, at least 72%, at least 74%, at least 76, at least 78%, at least 80%, at least 82%, at least 84%, at least 86%, at least 88%, at least 90%, at least 92%, at least 94%, at least 96%, at least 98%, or at least 99% of the mold cavity is filled with the molten thermoplastic material. For example, substantially the entire mold cavity is filled when about 70% to about 100%, about 75% to about 99%, about 80% to about 98%, or about 90% to about 95% of the mold cavity is filled with the molten thermoplastic material. The percentage of the mold cavity filled with the shot comprising molten thermoplastic material can be determined, for example, by placing a pressure transducer in the mold cavity at the end of fill point of the mold cavity corresponding to the desired fill percentage. The pressure transducer alerts the operator when the shot comprising molten thermoplastic material has reached the desired fill percentage.

Referring to FIG. 5, in one embodiment, once substantially the entire mold cavity is filled (at the end of time t3), a reduced melt pressure may be used to fill and pack the remaining portion of the mold cavity (time t3').

The remaining portion of the mold cavity can be filled while maintaining the melt pressure of the shot comprising molten thermoplastic material substantially constant at the pack pressure. The pack pressure can be, for example, at least 50%, at least 55%, at least 60%, at least 65%, at least 70%, at least 75%, at least 80%, at least 85%, at least 90%, at least 95%, or at least 99% of the melt pressure.

In another embodiment, once substantially the entire mold cavity is filled, the melt pressure can be increased to fill and pack the remaining portion of the mold cavity. During this pack phase, typically after the mold cavity is somewhere on the order of 95 to 99% filled with molten polymeric material, additional molten polymeric material is forced into the mold cavity to finish the fill and compensate for volumetric shrinkage that occurs as the polymeric material cools and solidifies. If a mold cavity is not adequately "packed" at the end of fill, it could lead to what is known as a "short shot", resulting in defects in the products to be molded.

It is recognized that the pack phase and the fill phase can overlap, and that the pack phase may be performed at the same or substantially the same pressure as the fill phase, such that there would not be a discernible transition on a pressure/time plot from the fill phase to the pack phase.

Maintaining Substantially Constant Pressure

In one embodiment, a hydraulic pressure is applied to the shot comprising molten thermoplastic material 24 to inject the shot comprising molten thermoplastic material 24 into the mold cavity at the melt temperature. The hydraulic pressure can be applied, for example, by translating the extruder system 22 in the direction of arrow A in FIG. 6, toward the nozzle 26, to force the shot comprising molten thermal plastic material 24 through the nozzle 26 and into the mold cavity 32. The melt pressure is then maintained substantially constant during filling of the shot comprising molten thermoplastic material 24 into the mold cavity 32 by monitoring the melt pressure of the shot comprising the molten thermoplastic material 23 upon injection into the mold cavity 32 and the melt pressure of the shot comprising the molten thermoplastic material 24 during filling of the mold cavity 32, and adjusting the hydraulic pressure applied to the shot comprising the molten thermoplastic material during injection into the mold cavity. The melt pressure can be monitored using pressure transducers disposed at the injection point, for example, the nozzle 26, and in the mold cavity 32.

A controller 50 is communicatively connected with a sensor 52 and a screw control 36. The controller 50 may include a microprocessor, a memory, and one or more communication links. The controller 50 may be connected to the sensor 52 and the screw control 36 via wired connections 54, 56, respectively. In other embodiments, the controller 50 may be connected to the sensor 52 and screw control 56 via a wireless connection, a mechanical connection, a hydraulic connection, a pneumatic connection, or any other type of communication connection known to those having ordinary skill in the art that will allow the controller 50 to communicate with both the sensor 52 and the screw control 36.

In the embodiment of FIG. 6, the sensor 52 is a pressure sensor that measures (directly or indirectly) melt pressure of the molten thermoplastic material 24 in the nozzle 26. The sensor 52 generates an electrical signal that is transmitted to the controller 50. The controller 50 then commands the screw control 36 to advance the screw 22 at a rate that maintains a substantially constant melt pressure of the molten thermoplastic material 24 in the nozzle 26. While the sensor 52 may directly measure the melt pressure, the sensor 52 may measure other characteristics of the molten thermoplastic material 24, such as temperature, viscosity, and flow rate, that are indicative of melt pressure. Likewise, the sensor 52 need not be located directly in the nozzle 26, but rather the sensor 52 may be located at any location within the injection system 12 or mold 28 that is fluidly connected with the nozzle 26. The sensor 52 need not be in direct contact with the injected fluid and may alternatively be in dynamic communication with the fluid and able to sense the pressure of the fluid and/or other fluid characteristics. If the sensor 52 is not located within the nozzle 26, appropriate correction factors may be applied to the measured characteristic to calculate the melt pressure in the nozzle 26. In yet other embodiments, the sensor 52 need not be disposed at a location which is fluidly connected with the nozzle. Rather, the sensor could measure clamping force generated by the clamping system 14 at a mold parting line between the first and second mold parts 25, 27. In one aspect the controller 50 may maintain the pressure according to the input from sensor 52. The sensor can be hard wired stationary or can be a moving sensor. The sensor can be used to sense all cavities rather than on or two. Additionally the sensors can be used on a wide variety of family of molds.

Although an active, closed loop controller 50 is illustrated in FIG. 6, other pressure regulating devices may be used instead of the closed loop controller 50. For example, a pressure regulating valve (not shown) or a pressure relief valve (not shown) may replace the controller 50 to regulate the melt pressure of the molten thermoplastic material 24. More specifically, the pressure regulating valve and pressure relief valve can prevent over pressurization of the mold 28. Another alternative mechanism for preventing over pressurization of the mold 28 is to activate an alarm when an over pressurization condition is detected.

Thus in another embodiment, the molding apparatus can include a pressure relief valve disposed between an injection point and the mold cavity. The pressure relief valve has a predetermined pressure set point, which is equal to desired melt pressure for injection and filling of the mold cavity. The melt pressure during injection and filling of the mold cavity is maintained substantially constant by applying a pressure to the shot comprising molten thermoplastic material to force the shot comprising molten thermoplastic material through the pressure relief valve at a melt pressure higher than the predetermined set point. The pressure relief valve then reduces the melt pressure of the shot comprising the thermoplastic material as it passes through the pressure relief valve and is injected into the mold cavity. The reduced melt pressure of the shot comprising molten thermoplastic material corresponds to the desired melt pressure for filling of the mold cavity and is maintained substantially constant by the predetermined set point of the pressure release valve.

In one embodiment, the melt pressure is reduced by diverting a portion of the shot comprising thermoplastic material to an outlet of the pressure relief valve. The diverted portion of the shot comprising thermoplastic material can be maintained in a molten state and can be reincorporated into the injection system, for example, through the heated barrel.

Mold Cavity

The molding apparatus includes a mold having at least one mold cavity. The mold can include any suitable number of mold cavities. Embodiments of the method disclosed herein advantageously allow for use of molds having asymmetrically oriented mold cavities and/or mold cavities having different shapes. The use of the low, substantially constant filling pressures of embodiments of the method can allow for each mold cavity to be filled under balanced packing conditions despite asymmetry in the mold cavity arrangement. Thus, quality injection molded parts can be formed in each of the mold cavities of the mold despite the asymmetric orientation. The ability to asymmetrically arrange the mold cavities of a mold can advantageously allow for high mold cavity density in a mold, thereby allowing for an increased number of injection molded parts to be formed by a single mold and/or allowing for a reduction in the size of the mold.

Mold Cavity Pressure

As used herein, the "mold cavity pressure" refers to the pressure within a closed mold cavity. The mold cavity pressure can be measured, for example, using a pressure transducer placed inside the mold cavity. In embodiments of the method, prior to injection of the shot comprising molten thermoplastic material into the mold cavity, the mold cavity pressure is different than the pre-injection pressure of the shot comprising molten thermoplastic material. For example, the mold cavity pressure can be less than the pre-injection pressure of the shot comprising molten thermoplastic material. In another embodiment, the mold cavity pressure can be greater than the pre-injection pressure of the shot comprising molten thermoplastic material. For example, the mold cavity pressure prior to injection can be at least 10%, at least 15%, at least 20%, at least 25%, at least 30%, at least 40%, or at least 50% different (greater or less than) than the pre-injection pressure of the shot comprising molten thermoplastic material. In one embodiment, the mold cavity pressure is at least 15 psi different (greater or less than) the pre-injection pressure of the shot comprising molten thermoplastic material. Referring to FIGS. 2 and 4, in various embodiments, the mold cavity pressure prior to injection can be atmospheric pressure. In other embodiments, for example, as shown in FIG. 3, the mold cavity pressure can have a pressure greater than atmospheric pressure. In yet another embodiment, the mold cavity can be maintained at a vacuum prior to injection.

In various embodiments, the mold cavity pressure can be maintained substantially constant during filling of substantially the entire mold cavity with the shot comprising molten thermoplastic material. The term "substantially constant pressure" as used herein with respect to a melt pressure of a thermoplastic material, means that deviations from a baseline melt pressure do not produce meaningful changes in physical properties of the thermoplastic material. For example, "substantially constant pressure" includes, but is not limited to, pressure variations for which viscosity of the melted thermoplastic material do not meaningfully change. The term "substantially constant" in this respect includes deviations of up to approximately 30% from a baseline melt pressure. For example, the term "a substantially constant pressure of approximately 4600 psi" includes pressure fluctuations within the range of about 6000 psi (30% above 4600 psi) to about 3200 psi (30% below 4600 psi). A melt pressure is considered substantially constant as long as the melt pressure fluctuates no more than 30% from the recited pressure.

For example, the substantially constant pressure can fluctuate (either as an increase or decrease) from the melt pressure about 0% to about 30%, about 2% to about 25%, about 4% to about 20%, about 6% to about 15%, and about 8% to about 10%. Other suitable fluctuation amounts includes about 0, 2, 4, 6, 8, 10, 12, 14, 16, 18, 20, 22, 24, 26, 28, and 30%. Referring to FIG. 2, for example, the mold cavity pressure can be maintained at substantially constant atmospheric pressure during filling of substantially the entire mold cavity with the shot comprising molten thermoplastic material. Referring to FIG. 3, for example, the mold cavity pressure can be maintained substantially constant at a pressure greater than atmospheric pressure that is equal to the pre-injection pressure of the mold cavity. In another embodiment, the mold cavity pressure can be maintained at a substantially constant pressure that is greater than the pre-injection pressure of the mold cavity. For example, suitable mold cavity pressures for filling of the mold cavity include, for example, about 50 psi to about 500 psi.

The mold cavity can include, for example, one or more vents for maintaining the mold cavity pressure substantially constant. The vents can be controlled to open and close in order to maintain the substantially constant mold cavity pressure.

In one embodiment, a vacuum can be maintained in the mold cavity during injection and filling of substantially the entire mold cavity with the shot comprising molten thermoplastic. Maintaining a vacuum in the mold cavity during injection can advantageously reduce the amount of melt pressure required to fill the cavity, as there is no air to force from the mold cavity during filling. The lack of air resistance to the flow and the increased pressure drop between the melt pressure and the end of fill pressure can also result in a greater flow length of the shot comprising molten thermoplastic material.

Referring to FIG. 5, in another embodiment, the mold cavity pressure can increase during filling of substantially the entire mold cavity with the shot comprising molten thermoplastic material. For example, the mold cavity pressure can increase proportionally to the displaced volume of the mold cavity during filling. The increase in mold cavity pressure can occur, for example, at a substantially constant rate. The mold cavity can include a vent for maintaining the increasing mold cavity pressure below a predetermined set point. The predetermined set point can be, for example, about the melt pressure of the shot comprising molten thermoplastic material. The predetermined set point can also be, for example, a pressure above which could damage the mold cavity or adversely affect the quality of the injection molded part.

Once the mold cavity is completely filled with the shot comprising molten thermoplastic material and the material has cooled, the mold cavity pressure can be vented, if necessary, to atmospheric pressure and the mold can be opened to release the injection molded part.

Thermoplastic Material

A variety of thermoplastic materials can be used in the low, substantially constant pressure injection molding methods of the disclosure. In one embodiment, the molten thermoplastic material has a viscosity, as defined by the melt flow index of about 0.1 g/10 min to about 500 g/10 min, as measured by ASTM D1238 performed at a temperature of about 230 C and a weight of 2.16 kg. For example, for polypropylene the melt flow index can be in a range of about 0.5 g/10 min to about 200 g/10 min. Other suitable melt flow indexes include about 1 g/10 min to about 400 g/10 min, about 10 g/10 min to about 300 g/10 min, about 20 to about 200 g/10 min, about 30 g/10 min to about 100 g/10 min, about 50 g/10 min to about 75 g/10 min, about 0.1 g/10 min to about 1 g/10 min, or about 1 g/10 min to about 25 g/10 min. The MFI of the material is selected based on the application and use of the molded article. For examples, thermoplastic materials with an MFI of 0.1 g/10 min to about 5 g/10 min may be suitable for use as preforms for Injection Stretch Blow Molding (ISBM) applications. Thermoplastic materials with an MFI of 5 g/10 min to about 50 g/10 min may be suitable for use as caps and closures for packaging articles. Thermoplastic materials with an MFI of 50 g/10 min to about 150 g/10 min may be suitable for use in the manufacture of buckets or tubs. Thermoplastic materials with an MFI of 150 g/10 min to about 500 g/10 min may be suitable for molded articles that have extremely high L/T ratios such as a thin plate. Manufacturers of such thermoplastic materials generally teach that the materials should be injection molded using melt pressures in excess of 15,000 psi, and often in great excess of 15,000 psi. Contrary to conventional teachings regarding injection molding of such thermoplastic materials, embodiments of the low, constant injection molding method of the disclosure advantageously allow for forming quality injection molded parts using such thermoplastic materials and processing at melt pressures below 15,000 psi, and possibly well below 15,000 psi.

The thermoplastic material can be, for example, a polyolefin. Exemplary polyolefins include, but are not limited to, polypropylene, polyethylene, polymethylpentene, and polybutene-1. Any of the aforementioned polyolefins could be sourced from bio-based feedstocks, such as sugarcane or other agricultural products, to produce a bio-polypropylene or bio-polyethylene. Polyolefins advantageously demonstrate shear thinning when in a molten state. Shear thinning is a reduction in viscosity when the fluid is placed under compressive stress. Shear thinning can beneficially allow for the flow of the thermoplastic material to be maintained throughout the injection molding process.

The thermoplastic material can also be, for example, a polyester. Exemplary polyesters include, but are not limited to, polyethylene terphthalate (PET). The PET polymer could be sourced from bio-based feedstocks, such as sugarcane or other agricultural products, to produce a partially or fully bio-PET polymer. Other suitable thermoplastic materials include copolymers of polypropylene and polyethylene, and polymers and copolymers of thermoplastic elastomers, polyester, polystyrene, polycarbonate, poly(acrylonitrile-butadiene-styrene), poly(lactic acid), bio-based polyesters such as poly(ethylene furanate) polyhydroxyalkanoate, poly(ethylene furanoate), (considered to be an alternative to, or drop-in replacement for, PET), polyhydroxyalkanoate, polyamides, polyacetals, ethylene-alpha olefin rubbers, and styrene-butadiene-styrene block copolymers. The thermoplastic material can also be a blend of multiple polymeric and non-polymeric materials. The thermoplastic material can be, for example, a blend of high, medium, and low molecular polymers yielding a multi-modal or bi-modal blend. The multi-modal material can be designed in a way that results in a thermoplastic material that has superior flow properties yet has satisfactory chemo/physical properties. The thermoplastic material can also be a blend of a polymer with one or more small molecule additives. The small molecule could be, for example, a siloxane or other lubricating molecule that, when added to the thermoplastic material, improves the flowability of the polymeric material.

Other additives may include inorganic fillers such calcium carbonate, calcium sulfate, talcs, clays (e.g., nanoclays), aluminum hydroxide, $CaSiO_3$, glass formed into fibers or microspheres, crystalline silicas (e.g., quartz, novacite, crystallobite), magnesium hydroxide, mica, sodium sulfate, lithopone, magnesium carbonate, iron oxide; or, organic fillers such as rice husks, straw, hemp fiber, wood flour, or wood, bamboo or sugarcane fiber.

Other suitable thermoplastic materials include renewable polymers such as nonlimiting examples of polymers produced directly from organisms, such as polyhydroxyalkanoates (e.g., poly(beta-hydroxyalkanoate), poly(3-hydroxybutyrate-co-3-hydroxyvalerate, NODAX (Registered Trademark)), and bacterial cellulose; polymers extracted from plants, agricultural and forest, and biomass, such as polysaccharides and derivatives thereof (e.g., gums, cellulose, cellulose esters, chitin, chitosan, starch, chemically modified starch, particles of cellulose acetate), proteins (e.g., zein, whey, gluten, collagen), lipids, lignins, and natural rubber; thermoplastic starch produced from starch or chemically starch and current polymers derived from naturally sourced monomers and derivatives, such as bio-polyethylene, bio-polypropylene, polytrimethylene terephthalate, polylactic acid, NYLON 11, alkyd resins, succinic acid-based polyesters, and bio-polyethylene terephthalate.

The suitable thermoplastic materials may include a blend or blends of different thermoplastic materials such in the examples cited above. As well the different materials may be a combination of materials derived from virgin bio-derived or petroleum-derived materials, or recycled materials of bio-derived or petroleum-derived materials. One or more of the thermoplastic materials in a blend may be biodegradable. And for non-blend thermoplastic materials that material may be biodegradable.

Exemplary thermoplastic resins together with their recommended operating pressure ranges are provided in the following chart:

Injection Pressure Material Full Name Range (PSI) Company Brand Name pp Polypropylene 10000-15000 RTP RTP 100 Imagineering series Plastics Poly-propylene Nylon 10000-18000 RTP RTP 200 Imagineering series Plastics Nylon ABS Acrylonitrile 8000-20000 Marplex Astalac Butadiene ABS Styrene PET Polyester 5800-14500 Asia AIE PET International 401F Acetal 7000-17000 API Kolon Kocetal Copolymer PC Polycarbonate 10000-15000 RTP RTP 300 Imagineering series Plastics Poly-carbonate PS Polystyrene 10000-15000 RTP RTP 400 Imagineering series Plastics SAN Styrene 10000-15000 RTP RTP 500 Acrylonitrile Imagineering series Plastics PE LDPE & 10000-15000 RTP RTP 700 HDPE Imagineering Series Plastics TPE Thermoplastic 10000-15000 RTP RTP 1500 Elastomer Imagineering series Plastics PVDF Polyvinylidene 10000-15000 RTP RTP 3300 Fluoride Imagineering series Plastics PTI Poly-10000-15000 RTP RTP 4700 trimethylene Imagineering series Terephthalate Plastics PBT Polybutylene 10000-15000 RTP RTP 1000 Terephthalate Imagineering series Plastics PLA Polylactic Acid 8000-15000 RTP RTP 2099 Imagineering series Plastics.

While more than one of the embodiments involves filling substantially the entire mold cavity with the shot comprising the molten thermoplastic material while maintaining the melt pressure of the shot comprising the molten thermoplastic material at a substantially constant pressure of less than 15,000 psi, specific thermoplastic materials benefit from the invention at different constant pressures. Specifically: PP, nylon, PC, PS, SAN, PE, TPE, PVDF, PTI, PBT, and PLA at a substantially constant pressure of less than 10000 psi; ABS at a substantially constant pressure of less than 8000 psi; PET at a substantially constant pressure of less than 5800 psi; Acetal copolymer at a substantially constant pressure of less than 7000 psi; plus poly(ethylene furanate) polyhydroxyalkanoate, polyethylene furanoate (aka PEF) at substantially constant pressure of less than 10000 psi, or 8000 psi, or 7000 psi or 6000 psi, or 5800 psi.

As described in detail above, embodiments of the disclosed low, substantially constant pressure method can achieve one or more advantages over conventional high pressure injection molding processes, prior art high constant pressure injection molding processes, and prior art lower pressure injection molding process. For example, embodiments include a more cost effective and efficient process that eliminates the need to balance the pre-injection pressures of the mold cavity and the thermoplastic materials, a process that allows for use of atmospheric mold cavity pressures and, thus, simplified mold structures that eliminate the necessity of pressurizing means, the ability to use lower hardness, high thermal conductivity mold cavity materials that are more cost effective and easier to machine, a more robust processing method that is less sensitive to variations in the temperature, viscosity, and other material properties of the thermoplastic material, and the ability to produce quality injection molded parts at low pressures without premature hardening of the thermoplastic material in the mold cavity and without the need to heat or maintain constant temperatures in the mold cavity.

In one example, sample parts were molded using a low constant pressure process below 6000 PSI of injection pressure.

Samples were isolated from the injection molded parts using a common laboratory microtome. At least four samples were taken from each injection molded part. The cross section of the samples were then prepared to expose the compositional layers (skin, core, etc.) of each sample.

Synchrotron measurements were taken at Deutsches Elektronen Synchrotron (DESY) beamline G3 at DORIS III with the MAXIM detector ensemble, i.e. first measurements were taken by the point averaging scintillation counting device to obtain overviews of sample diffraction. Spatially resolved diffraction images were then taken by the position sensitive camera of MAXIM (a 2D detector Hamamatsu 4880 with multichannel plate [MCP] in front of its CCD sensor).

Synchrotron measurements revealed that injection molded parts having a certain thickness, that were molded using a low constant pressure process show a distinct and discernible extra band or zone of oriented polypropylene crystallites in the core of the part. This extra zone of oriented material can be seen in parts molded using either steel or aluminum molds. Parts molded using a conventional, higher pressure process usually have a reduced number of oriented bands when compared to a part molded using a low constant pressure process.

Continuous Molding

The typical melt screw in injection mold presses is a screw-type pump that mixes and shears the resin into melt. As the screw slowly retracts, allowing melt to flow through the open ring-type check valve, melt accumulates in the barrel ahead of the check valve portion of the screws. To advance resin at a controlled volumetric flow rate, the screw stops spinning and moves forward, closing the check valve and converting its function from a screw pump (wherein the system is operated so as to maintain a controlled pressure in the melt, and to allow the volumetric flow rate to vary, which is referred to herein as a positive pressure type motivation methodology) to a syringe pump (wherein positive displacement is used to control volumetric flow rate, irrespective of the resulting pressure in the melt).

By using two or more screw systems, it is possible to deliver the melt at a substantially constant flow rate and regulate the pressure of the melt so that it remains substantially constant as it is fed through a plurality of feed channels to respective mold cavities in selective or permanent fluid communication with the feed channels.

Figure 7:
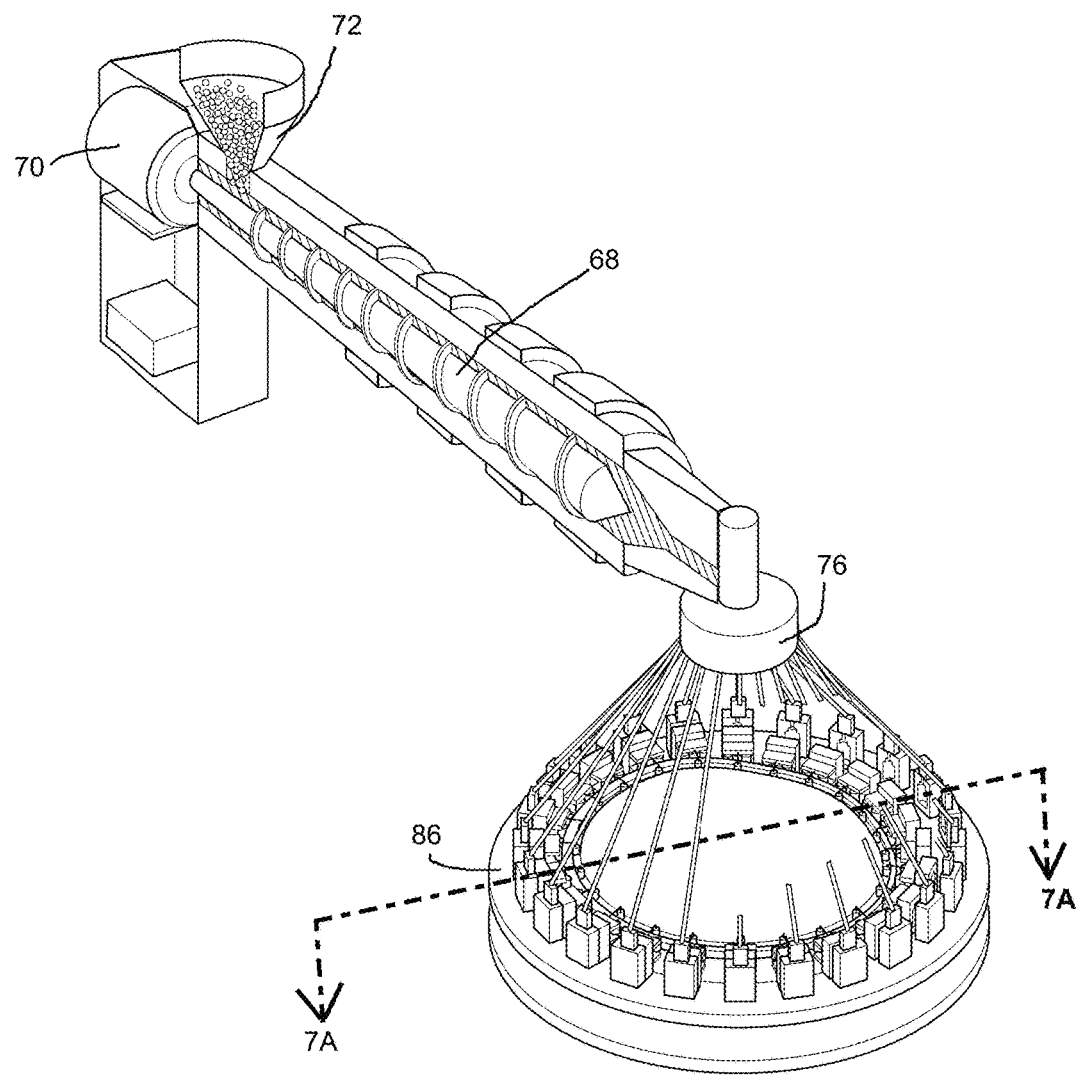
FIG. 7 is a perspective view of a pump that provides a continuous supply of molten polymeric material in combination with a plurality of feed channels of a continuous injection molding system of the present disclosure.
Figure 8:
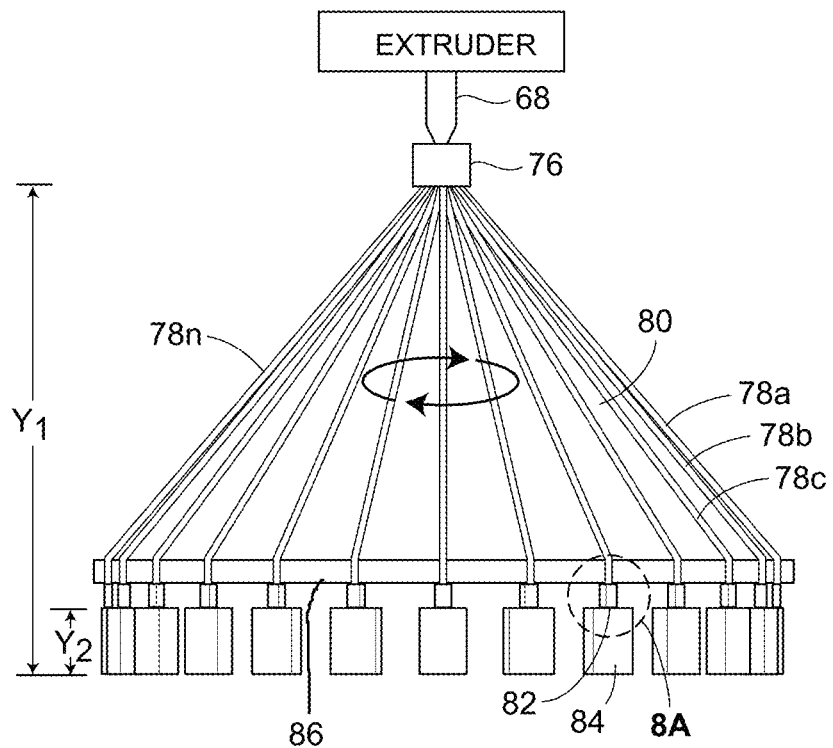
FIG. 8 is a front semi-schematic view of a plurality of feed channels and a molding section of a continuous injection molding system of the present disclosure.

A screw pump 68 suitable for supplying a continuous flow of melt is illustrated in FIG. 7. The screw pump 68 may include a rotary motor 70, a hopper 72, a screw 74, and a nozzle 76. The screw pump 68 may be in the form of, or similar to, an extruder. In FIG. 8, the screw pump 68 is illustrated schematically. The nozzle 76 is provided at a first elevation $Y_1$ and is in fluid communication with a plurality of inclined feed channels 78 (which, from right-to-left in the drawing figure, are referenced as 78a, 78b, . . . , 78n). The plurality of feed channels 78a, 78b, . . . , 78n, may be disposed in a conical distribution, and may be supported by a rotating conical feed channel plate 80.

Figure 8A:
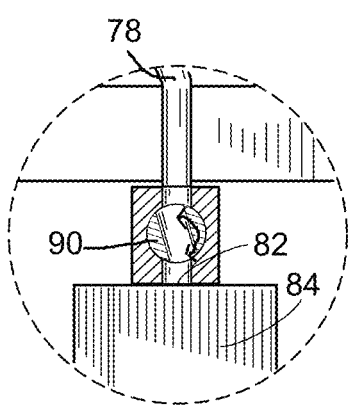
FIG. 8A is an enlarged view of the region depicted by dashed lines identified as 8A in FIG. 8, illustrating an interface between an inclined feed channel and the mold cavity of the continuous injection molding system of the present disclosure.

As illustrated in FIG. 8A, at a lower end of each of the inclined feed channels 78, the inclined feed channel 78 is in selective or permanent fluid communication with an inlet 82 of a mold cavity 84. The inlet 82, such as a sprue, is at a second elevation $Y_2$ that is lower than the first elevation $Y_1$ of the nozzle 76. While illustrated in FIG. 8 at the top of the mold cavity 84, it is recognized that the inlet 82 of the mold cavity 84 may be positioned at any desired height of the mold cavity 84, such as at the bottom or at a mid-point of the mold cavity 84. It is also recognized that the sprue may be provided anywhere intermediate a feed channel and respective mold cavity (i.e., there may be some length of feed line between an outlet of each sprue and an inlet 82 of each mold cavity). A plurality of mold cavities 84a, 84b, . . . , 84n (at least two) rotate along a mold cavity/core plate 86 at least part-way around the nozzle 76.

Figure 7A:
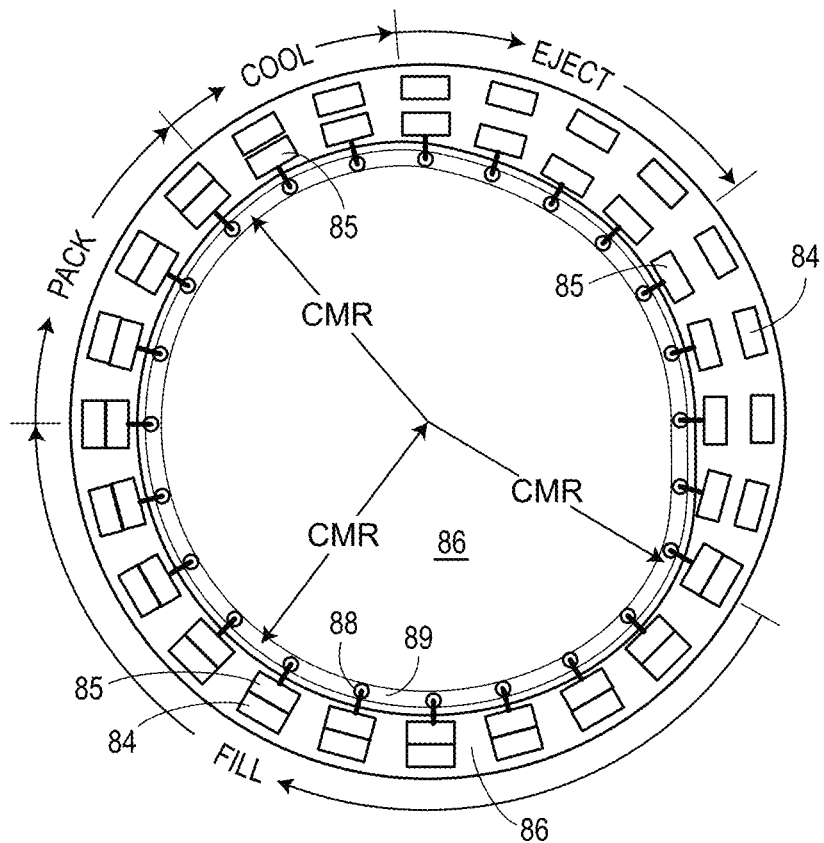
FIG. 7A is a top view of a rotary cavity/core plate having a cam track therein, taken along lines 7A-7A of FIG. 7.

In one embodiment, as illustrated in FIG. 7, the mold cavities 84a, 84b, . . . , 84n are disposed in a complete circle or revolution about the nozzle 76. Each mold cavity 84a, 84b, . . . , 84n has a respective mold core 85a, 85b, . . . , 85n associated therewith, and at least one of each of the mold cavities 84a, 84b, . . . , 84n and mold cores 85a, 85b, . . . , 85n is actuable relative to the respective mold core or mold cavity 84, such that the mold cavity 84 and mold core 85 form a tightly-sealed molding chamber at least during the portion of the revolution of the mold cavity/core plate 86 during which molten polymeric material is being delivered by a respective inclined feed channel 78. For instance, each of the mold cores 85a, 85b, . . . , 85n may have associated therewith a cam follower roller 88 that rides in a cam track 89 in the mold cavity/core plate 86, while each mold cavity 84, according to this embodiment, travels (i.e., revolves) in a fixed radius about the nozzle 76. As illustrated in FIG. 7A, the cam track 89 has a constant maximum radius CMR along a portion of the mold cavity/core plate 86 that extends from an angular position at least immediately upstream of (i.e. just prior to) initiation of molding to at least immediately beyond an angular position at which a mold cavity 84 is packed or at least filled. Along portions of the cam track 89 corresponding to non-molding positions (i.e., along an arcuate region of the mold cavity/core plate 86 during which no filling or packing of the mold cavities 84 is taking place), the radius of the cam track 89 reduces to a dwell region, along which the mold cores 85 are fully separated from the respective mold cavities 84. The region of the cam track 89 where the radius of the cam track 89 reduces from $R_{CMR}$ to $R_{DWELL}$ causes the mold cores 85 to move radially inwardly, resulting in separation of the mold cavities 84 and mold cores 85, thereby facilitating cooling and ejection of molded parts from the mold cavities 84. After ejection of the molded parts from each of the mold cavities 84, each of the respective mold cores 85 and mold cavities 84 begin a new revolution or cycle, thereby closing together to again form a tightly-sealed molding chamber that is brought into fluid communication with a respective inclined feed channel 78 so as to be ready to receive additional molten polymeric material (i.e., to mold an additional part).

As used herein, the term "arcuate" when describing the disposition of mold cavities 84 relative to the nozzle 76 along the cam track 89 refers to a region having a substantially constant radius relative to the nozzle, along an arc length of at least 15°, up to and including 360° (i.e., a circular arrangement).

Figure 7B:
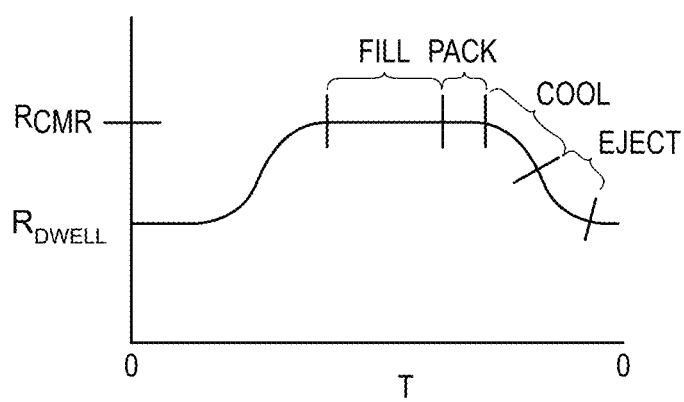
FIG. 7B is a plot illustrating the radius of the cam track over time during one revolution of a mold core about the nozzle of the continuous supply of molten polymeric material of FIG. 7.

The radius of the cam track 89 over the time to complete a full revolution of a given mold cavity 84 and respective mold core 85 about the nozzle 76 is plotted in FIG. 7B, with identification of molding operations that would occur along the respective regions of the cam track 89. If desired, alternate pairs of mold cavities and mold cores could travel along different cam tracks, which may be desired to facilitate performing a particular operation on a plurality of mold cavities simultaneously. For instance, odd mold cores 85a, 85c, 85e, . . . 85n could have cam followers $88_{odd}$ riding along a first cam track $89_{odd}$ and even mold cores 85b, 85d, 85f, . . . , 85n+1 could have cam followers $88_{even}$ riding along a second cam track $89_{even}$ even having a similar cam profile to that of the first cam track $89_{odd}$, but slightly offset, such that pairs of odd and even mold cores 85n and 85n+1 undergo the same operations at the same time, either through portions of a revolution, or through an entire revolution, of the mold cores 85 about the nozzle 76. The second cam track $89_{even}$ may have a smaller maximum radius CMR than the first cam track $89_{odd}$ and the links between the cam followers $88_{even}$ and their respective mold cores 85b, 85d, 85f, . . . , 85n+1 may be longer than the links between the cam followers $88_{odd}$ and their respective mold cores 85a, 85c, 85e, . . . 85n to avoid cam followers from one of the cam tracks switching to the other cam track or otherwise impeding smooth revolutions of the mold cores 85 about the nozzle 76.

In order to achieve a region of molding at a relatively higher pressure in a continuous molding system, where a single source of molten polymeric material supplies multiple feed channels 78, it is necessary to dynamically adjust the pressure within a given inclined feed channel 78, depending on the molding phase desired to be performed at the location of the inclined feed channel 78 and its associated mold cavity 84. Because the inclined feed channels 78a, 78b, . . . , 78n and mold cavities 84a, 84b, . . . , 84n rotate about the nozzle 76, a desired molding cycle phase can be performed along a predictable and identifiable arc length of the path of the mold cavities 84a, 84b, . . . , 84n, as illustrated in FIG. 7A.

The rate at which molten polymeric material in a given feed channel 78 is introduced to an inlet 82 of a respective mold cavity 84 can be controlled by a metering gate or controllable valve 90. The controllable valve 90 may take the form of a rotatable ball gate valve 92, as illustrated in FIG. 8A. Alternately, a gate valve, a butterfly valve, a needle valve, an iris-type valve, a flap valve, a reed valve, a flapper valve, a diaphragm valve, a disc valve, a check (ball-type) valve, a check (ring-type) valve, a duckbill valve, or some other type of valve could be employed. The position of the controllable valve 90 may be controlled by a controller, such as a servo-drive controller, so as to dynamically adjust the position of the controllable valve 90 as the inclined feed channel 78 and mold cavity 84 reach particular locations along the arc length of the mold cavity/core plate 86. Alternately, the rotating conical feed channel plate 80, a metering plate 96, or some external structure may be provided with a camming or triggering mechanism, such as an electromagnetic switch, that imparts a change to the valve position at a given location along the arc length of the mold cavity/core plate 86.

When the controllable valve 90 is fully open, the molten polymeric material is free to flow from the inclined feed channel 78 into the respective mold cavity 84 at a nominal pressure. As the controllable valve 90 is actuated from its fully-open state to a partially closed state, the construction causes the pressure of the molten polymeric material downstream of the controllable valve 90 (i.e., the pressure of the melt as it flows into the mold cavity) to decrease.

In order to detect pressure of molten polymeric material entering each mold cavity to ensure a constant pressure is being maintained in each mold cavity 84, and to make adjustments as-needed to correct for any unacceptable variances from the desired constant pressure, one or more pressure sensors (not shown) can be provided in fluid communication with the interior of each of the mold cavities 84. In a carousel-type multi-cavity injection molding system as disclosed herein, there is a need to enable the pressure signals to be transmitted by each of the pressure sensors, notwithstanding the fact that the pressure sensors are rotating together with the mold cavities 84. There are several alternatives to hard-wired communication of pressure signals from the plurality of pressure sensors associated with the mold cavities 84. For instance, each of the pressure sensors may communicate a pressure signal using a radio frequency relay (e.g., RFID), or a BLUETOOTH or Wifi signal could be utilized to transmit the pressure signal to a central controller that, based on the pressure signals, can make adjustments to valve positions of the controllable valves 90 as needed to obtain desired pressure in individual mold cavities 84. In a particular embodiment, in lieu of a wired connection a pressure sensor can make intermittent contact with one of a plurality of pressure sensor contact pads (not shown) positioned in a series along at least an arcuate portion of the carousel, with a signal corresponding to pressure measured by the pressure sensor instantaneously communicated to the pressure sensor contact pad upon such contact, which in turn communicates the sensed pressure data to the central controller.

As an alternative to providing wireless communication from a plurality of pressure sensors that dynamically move with the rotating mold cavities 84, a plurality of stationary pressure sensors may be used that have either a hard-wired or wireless communication with a central controller. For instance, a pin (not shown) in fluid communication with an interior of a mold cavity 84 could ride along the carousel with the mold cavity, but could exert pressure on a stationary transducer (not shown) positioned at a predetermined location at the periphery of the carousel. The pressure exerted on the stationary transducer by the pin would be directly proportional to the pressure of the melt within the mold cavity 84, such that the pressure detected by the stationary transducer can be communicated to the central controller and interpreted to make a determination as to whether any change to the pressure within that mold cavity 84 is needed, and if so, the central controller could send an appropriate instruction to reposition a valve 90 associated with the feed channel 78 corresponding to that mold cavity to accomplish the desired pressure change.

It is recognized that the pressure in each feed channel 78 upstream of the controllable valve 90 can be an accurate prediction of pressure within each associated mold cavity. For instance, when there is an adjustment to a valve position, an increase in pressure detected within the feed channel 78 upstream of the controllable valve 90 is indicative of a pressure decrease within the mold cavity 84. As such, in addition to or instead of pressure sensors within the mold cavity 84, it is recognized that pressure sensors in each of the feed channels 78 upstream of the valve 90 in the feed channels 78 can be used to collect pressure data useful in determining whether adjustments to valve position are necessary to achieve or maintain a desired constant pressure within the mold cavities 84. Given the carousel-like arrangement of inclined feed channels 78, the pressure sensors disposed in the feed channels 78 would similarly benefit from some alternative to hard-wired communication with a central controller, such as wireless radio frequency relay (e.g., RFID), BLUTOOTH, or Wifi).

In addition to pressure sensors in the mold cavities 84 and/or feed channels 78 in the vicinity of the valves 90, it may be desirable to have an additional pressure sensor in each of the feed channels 78 in the vicinity of the extruder 68 to detect pressure of molten polymeric material as it is being introduced to the individual feed channels. Data from pressure sensors indicative of pressure of molten polymeric material introduced to the individual feed channels 78 by an extruder system 68 would beneficially provide a central controller with information as to whether pressure delivered by the extruder system 68 is sufficiently high to deliver the desired constant pressure to all of the downstream mold cavities 84.

FIG. 14 illustrates a pressure profile for a method of continuous injection molding at substantially constant pressure, and includes lines representing potential pressure changes, above and below the nominal substantially constant pressure delivered by the inclined feed channels, such as may be desired for molding in particular cavities or particular regions of mold cavities.

Figure 9:
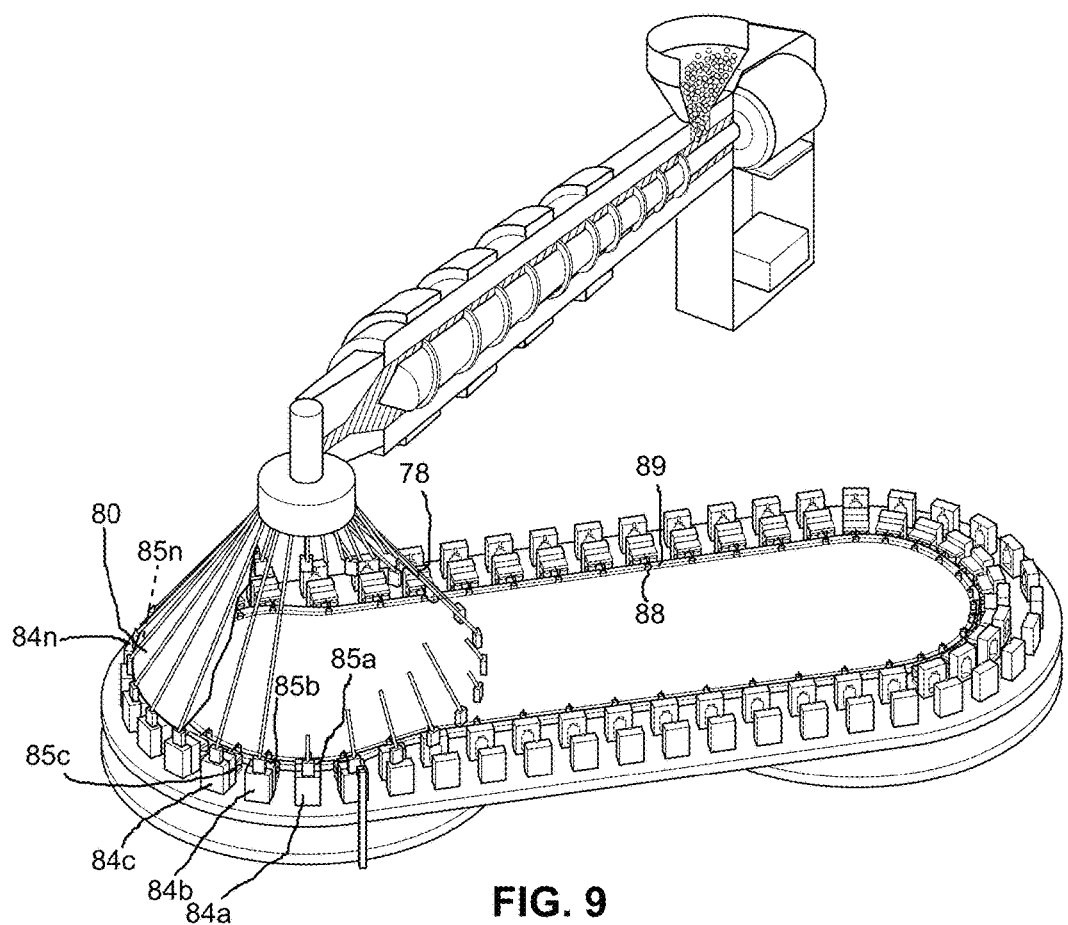
FIG. 9 is a perspective view of a continuous injection molding system according to an alternate embodiment of the present disclosure.
Figure 10:
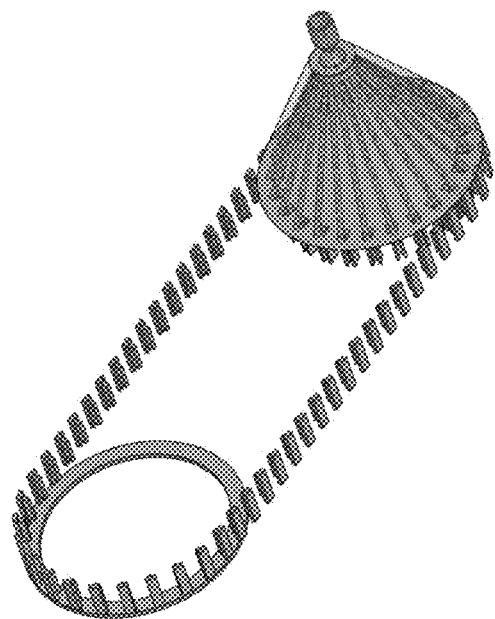
FIG. 10 is a top perspective view of a continuous injection molding system similar to that of FIG. 9, but with the mold cavities on the inside and the mold cores on the outside.
Figure 11:
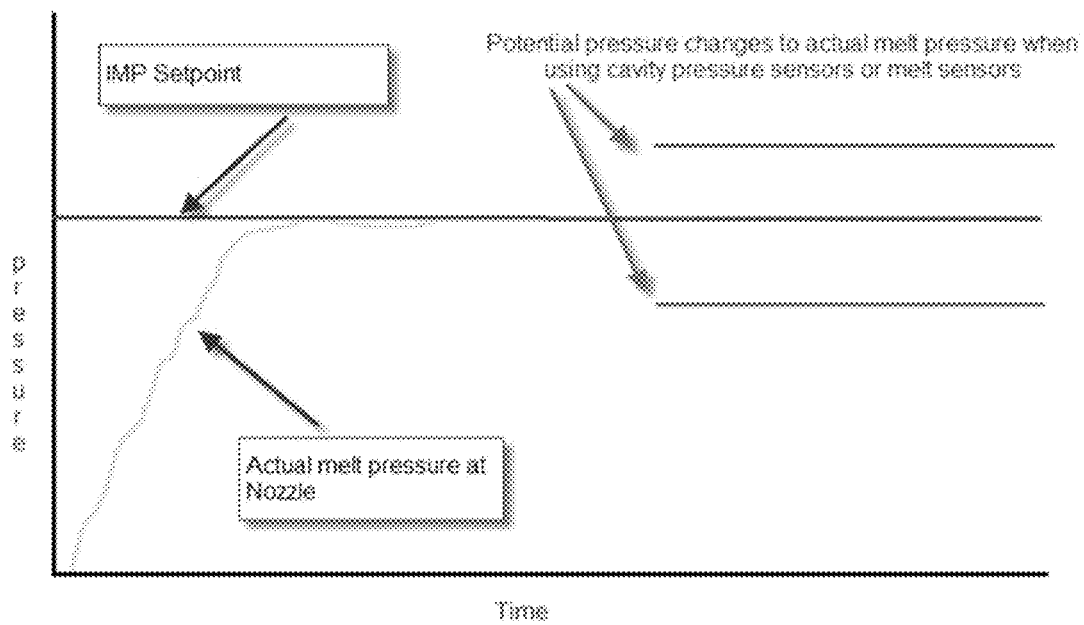
FIG. 11 is a schematic illustration of a pressure profile for a method of continuous injection molding at low, substantially constant pressure.

In another embodiment, as illustrated in FIGS. 9 and 10, the mold cavities 84a, 84b, . . . , 84n and respective mold cores 85a, 85b, . . . , 85n are only engaged with the mold cavity/core plate 86 along an arcuate portion thereof, such as along a half-circle. Along that arcuate region, at least one of each of the mold cavities 84a, 84b, . . . , 84n and the respective mold cores 85a, 85b, . . . , 85n is actuated into secure engagement with its respective mold core or mold cavity, such that the mold cavity 84 and mold core 85 form a tightly-sealed molding chamber at least during the portion of the revolution of the mold cavity/core plate 86 during which molten polymeric material is being delivered by a respective inclined feed channel 78 (which, as in the previous embodiment, may be part of a rotating conical feed channel plate 80). As in the previous embodiment, a cam track 89 may be provided to actuate each mold core 85 relative to a respective mold cavity 84.

As discussed above, utilizing a controller and feedback loop to regulate the rate of a extruder system upstream of a nozzle and manifold or feed system provides a possible manner of making finite adjustments to pressure of molten polymeric material delivered to a mold cavity of a multi-cavity molding system. Instead or in addition, it is possible to employ a pressure relief valve just upstream of an inlet of a mold cavity, having a set point that enables the relief valve to vent out a portion of molten polymeric material through a pressure relief outlet when the pressure exceeds that set point. In a continuous molding system of the present disclosure, the needs for, and benefits of, the ability to control pressure in the immediate vicinity of the inlet to the mold cavity are even more acute. Because each individual mold cavity only has a limited period of arc-length about the mold cavity/core plate 86 of the carousel along which it can receive molten polymeric material, it may be necessary to effectively tune the pressure of molten polymeric material being fed by one of the inclined feed channels 78 into the inlet of a respective mold cavity 84. Finite adjustments to the position of the controllable valve 90 result in immediate variations to the nominal pressure of molten polymeric material within the inclined feed channel 78 as it the molten material enters the mold cavity 84. These adjustments may be made in real time in response to sensed parameters or conditions within the mold cavity 84 or within the inclined feed channel 78, such as pressure, temperature, viscosity, or flow rate. Alternatively or in addition, the adjustments may be made based on predetermined conditions that call for specific deviations from the nominal, substantially constant pressure within the inclined feed channel 78.

For instance, it may be desirable to mold a plurality of different products, or different parts of products, in the various mold cavities 84a, 84b, 84c, . . . , 84n, using mold cavities of different volume, size, and/or shape. For example, to facilitate downstream assembly of a multi-part cap (not shown) of a molded container for a personal hygiene product or the like, a first plurality of mold cavities, such as odd-lettered mold cavities 84a, 84c, . . . , may be sized and shaped to mold a first, relatively large component of the cap, while a second plurality of mold cavities, such as even-lettered mold cavities 84b, 84d, . . . , may be sized and shaped to mold a second, relatively small component of the cap. The time that each of the lettered and even-lettered mold cavities is engaged with its respective inclined feed channel 78 along a portion of the carousel-like mold cavity/core plate 86 during which molding can occur is the same. As such, it may be necessary to operate the controllable valves 90 of the inclined feed channels 78 associated with the second plurality of mold cavities (i.e., the even-lettered mold cavities 84b, 84d, . . . ) so that they are open for a shorter duration than the valves 90 of the inclined feed channels 78 associated with the first plurality of mold cavities (i.e., the odd-lettered (relatively larger) mold cavities 84a, 84c, . . . ).

Additionally, it may be desirable to fill the first, odd-lettered plurality of mold cavities 84a, 84c, . . . , at either a higher or a lower pressure than the second, even-lettered plurality of mold cavities 84b, 84d, . . . . In order to accomplish this, the valves 90 of the inclined feed channels 78 associated with the first plurality of mold cavities 84a, 84c, . . . can be adjusted to a different position relative to the valves 90 of the inclined feed channels 78 associated with the second plurality of mold cavities 84b, 84d, . . . , along the arcuate portion of the carousel-like mold cavity/core plate 86 during which molding can occur.

Another advantage of being able to vary the pressure by controlled amounts during fill is the ability to offset or balance expansion in regions of varying thickness of the mold cavity, and/or to make adjustments to compensate for thermal contraction near the cavity walls. It may be particularly advantageous when molding thin-walled products, or thin-walled regions of products, to be able to make adjustments to the nominal pressure of molten polymeric material being delivered by an inclined feed channel.

The continuous nature of the present disclosure has many advantages:

First, each of the molding operations that must occur serially in a conventional injection molding operation (polymer shot melted; cooled mold halves clamped together under a clamping force; shot of molten polymer forced into the cooled mold cavity; polymer cools to a solid state; and ejection) can be accomplished simultaneously. While some stations are undergoing filling, cooling or ejection operations can be occurring at other stations. The ability to perform these operations simultaneously, rather than sequentially as done in conventional injection molding, creates an environment favorable to substantially-reduced cycle times. The systems and methods of the present disclosure are also conducive to varying output to increase or decrease production, for instance by rotating faster or increasing the diameter (or effective diameter for non-round systems) to accommodate more mold cavity/mold core pairs in order to meet the volume and cost targets of the business need.

Second, the molding pressures are isolated to a small portion of the rotational arc. Thus, the clamp tonnage to hold the mold close is applied only in this portion of the arc, and may be applied to as few as one mold cavity/mold core combination at a time, rather than all mold cavities simultaneously, as is the case in conventional multi-cavity injection molding. Thus, for a system that may require 500 tons of clamp pressure to hold a 64 cavity mold closed in a conventional system, in the newly discovered system the clamp tonnage could be as low as less than about 8 tons (500/64=7.8125). This is a huge advantage as the mechanical system required to hold the mold closed can be substantially reduced leading to much lower costs. Furthermore, the more compact system reduces mass and enables faster mold movements leading to increased production rates.

Third, the mold cavities can be greatly simplified in design, since there is lower clamp force required, cooling can be applied to the mold cavities in the non-filling portion of the rotational arc—thus no cooling (or very simple cooling) is needed in the mold cavities. Mold movements can be cam actuated to enable smooth and non-linear mold movements, and these features do not need to be integrated in to individual mold cavities. Thus, the cost of a unique mold set to produce a unique part type is much lower than with conventional injection molding.

Forth, the lower clamp tonnage and potential to use lower filling pressures enables the use of metallurgy to form the mold cavities that are more rapidly machined and have higher thermal conductivity. This enables molds to be manufactured faster, and provide higher productivity levels.

Fifth, the continuous motion of the process enables the integration of additional operations directly in line with the injection molding system. For example, a preform could be molded in the continuous motion injection molding process, then directly transferred (without losing orientation or control of the preform) to a rotational blow molding system to produce a blow molded article such as a bottle. Another example would be a cap could be molded, a sealing liner inserted, and a tamper evident perforation mechanically cut in to the closure all in subsequent continuous operations. Further, a label could be applied to the molded component immediately following molding. This leads to much higher productivity levels for the complete system and improved quality since control of the molded part can be maintained throughout each operation.

Part, parts, or all of any of the embodiments disclosed herein can be combined with part, parts, or all of other injection molding embodiments known in the art, including those described below.

Embodiments of the present disclosure can be used with embodiments for injection molding at low constant pressure, as disclosed in U.S. patent application Ser. No. 13/476,045 filed May 21, 2012, entitled "Apparatus and Method for Injection Molding at Low Constant Pressure" (applicant's case 12127) and published as US 2012-0294963 A1, which is hereby incorporated by reference.

Embodiments of the present disclosure can be used with embodiments for pressure control, as disclosed in U.S. patent application Ser. No. 13/476,047 filed May 21, 2012, entitled "Alternative Pressure Control for a Low Constant Pressure Injection Molding Apparatus" (applicant's case 12128), now U.S. Pat. No. 8,757,999, which is hereby incorporated by reference.

Embodiments of the present disclosure can be used with embodiments for non-naturally balanced feed systems, as disclosed in U.S. patent application Ser. No. 13/476,073 filed May 21, 2012, entitled "Non-Naturally Balanced Feed System for an Injection Molding Apparatus" (applicant's case 12130) and published as US 2012-0292823 A1, which is hereby incorporated by reference.

Embodiments of the present disclosure can be used with embodiments for injection molding at low, substantially constant pressure, as disclosed in U.S. patent application Ser. No. 13/476,197 filed May 21, 2012, entitled "Method for Injection Molding at Low, Substantially Constant Pressure" (applicant's case 12131Q) and published as US 2012-0295050 A1, which is hereby incorporated by reference.

Embodiments of the present disclosure can be used with embodiments for injection molding at low, substantially constant pressure, as disclosed in U.S. patent application Ser. No. 13/476,178 filed May 21, 2012, entitled "Method for Injection Molding at Low, Substantially Constant Pressure" (applicant's case 12132Q) and published as US 2012-0295049 A1, which is hereby incorporated by reference.

Embodiments of the present disclosure can be used with embodiments for co-injection processes, as disclosed in U.S. patent application Ser. No. 13/774,692 filed Feb. 22, 2013, entitled "High Thermal Conductivity Co-Injection Molding System" (applicant's case 12361), which is hereby incorporated by reference.

Embodiments of the present disclosure can be used with embodiments for molding with simplified cooling systems, as disclosed in U.S. patent application Ser. No. 13/765,428 filed Feb. 12, 2013, entitled "Injection Mold Having a Simplified Evaporative Cooling System or a Simplified Cooling System with Exotic Cooling Fluids" (applicant's case 12453M), now U.S. Pat. No. 8,591,219, which is hereby incorporated by reference.

Embodiments of the present disclosure can be used with embodiments for molding thinwall parts, as disclosed in U.S. patent application Ser. No. 13/476,584 filed May 21, 2012, entitled "Method and Apparatus for Substantially Constant Pressure Injection Molding of Thinwall Parts" (applicant's case 12487), which is hereby incorporated by reference.

Embodiments of the present disclosure can be used with embodiments for molding with a failsafe mechanism, as disclosed in U.S. patent application Ser. No. 13/672,246 filed Nov. 8, 2012, entitled "Injection Mold With Fail Safe Pressure Mechanism" (applicant's case 12657), which is hereby incorporated by reference.

Embodiments of the present disclosure can be used with embodiments for high-productivity molding, as disclosed in U.S. patent application Ser. No. 13/682,456 filed Nov. 20, 2012, entitled "Method for Operating a High Productivity Injection Molding Machine" (applicant's case 12673R), which is hereby incorporated by reference.

Embodiments of the present disclosure can be used with embodiments for molding certain thermoplastics, as disclosed in U.S. patent application Ser. No. 14/085,515 filed Nov. 20, 2013, entitled "Methods of Molding Compositions of Thermoplastic Polymer and Hydrogenated Castor Oil" (applicant's case 12674M), which is hereby incorporated by reference.

Embodiments of the present disclosure can be used with embodiments for runner systems, as disclosed in U.S. patent application Ser. No. 14/085,515 filed Nov. 21, 2013, entitled "Reduced Size Runner for an Injection Mold System" (applicant's case 12677M), which is hereby incorporated by reference.

Embodiments of the present disclosure can be used with embodiments for moving molding systems, as disclosed in U.S. patent application 61/822,661 filed May 13, 2013, entitled "Low Constant Pressure Injection Molding System with Variable Position Molding Cavities:" (applicant's case 12896P), which is hereby incorporated by reference.

Embodiments of the present disclosure can be used with embodiments for injection mold control systems, as disclosed in U.S. patent application 61/861,298 filed Aug. 20, 2013, entitled "Injection Molding Machines and Methods for Accounting for Changes in Material Properties During Injection Molding Runs" (applicant's case 13020P), which is hereby incorporated by reference.

Embodiments of the present disclosure can be used with embodiments for injection mold control systems, as disclosed in U.S. patent application 61/861,304 filed Aug. 20, 2013, entitled "Injection Molding Machines and Methods for Accounting for Changes in Material Properties During Injection Molding Runs" (applicant's case 13021P), which is hereby incorporated by reference.

Embodiments of the present disclosure can be used with embodiments for injection mold control systems, as disclosed in U.S. patent application 61/861,310 filed Aug. 20, 2013, entitled "Injection Molding Machines and Methods for Accounting for Changes in Material Properties During Injection Molding Runs" (applicant's case 13022P), which is hereby incorporated by reference.

Embodiments of the present disclosure can be used with embodiments for using injection molding to form overmolded articles, as disclosed in U.S. patent application 61/918,438 filed Dec. 19, 2013, entitled "Methods of Forming Overmolded Articles" (applicant's case 13190P), which is hereby incorporated by reference.

Embodiments of the present disclosure can be used with embodiments for controlling molding processes, as disclosed in U.S. Pat. No. 5,728,329 issued Mar. 17, 1998, entitled "Method and Apparatus for Injecting a Molten Material into a Mold Cavity" (applicant's case 12467CC), which is hereby incorporated by reference.

Embodiments of the present disclosure can be used with embodiments for controlling molding processes, as disclosed in U.S. Pat. No. 5,716,561 issued Feb. 10, 1998, entitled "Injection Control System" (applicant's case 12467CR), which is hereby incorporated by reference.

Embodiments of the present disclosure can be used with embodiments for molding preforms, as disclosed in U.S. patent application 61/952,281, entitled "Plastic Article Forming Apparatus and Methods for Using the Same" (applicant's case 13242P), which is hereby incorporated by reference.

Embodiments of the present disclosure can be used with embodiments for molding preforms, as disclosed in U.S. patent application 61/952,283, entitled "Plastic Article Forming Apparatus and Methods for Using the Same" (applicant's case 13243P), which is hereby incorporated by reference.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of injection molding comprising:
   advancing at least one of a plurality of mold cavity and mold core pairs along a continuous cam track, each of the mold cavity and mold core pairs being actuatable between an open condition along a first portion of the cam track and a closed condition along a second portion of the cam track;
   subsequent to the at least one of the plurality of actuatable mold cavity and mold core pairs being actuated to the closed condition, bringing an inlet of a mold cavity of the at least one of the plurality of actuatable mold cavity and mold core pairs into communication with a respective one of a plurality of inclined feed channels, the inclined feed channels being disposed in a conical distribution and being in fluid communication with a nozzle, the nozzle being at a different elevation than the inlet of the mold cavity of at least one of the plurality of actuatable mold cavity and mold core pairs;
   while the at least one of the plurality of mold cavity and mold core pairs is still in the closed condition and advancing along the second portion of the cam track, actuating, from a closed position to an open position, a controllable valve that selectively permits fluid communication from the respective one of the plurality of inclined feed channels to the inlet of the mold cavity of the at least one of the plurality of actuatable mold cavities and mold core pairs;
   continuously feeding a supply of molten polymeric material to the nozzle in fluid communication with the respective one of a the plurality of inclined feed channels while the at least one of the plurality of mold cavity and mold core pairs continues to advance along the second portion of the cam track, thereby introducing the molten polymeric material into the mold cavity of the at least one of the plurality of mold cavity and mold core pairs;
   actuating the controllable valve from the open position to the closed position to discontinue introducing the molten polymeric material into the mold cavity of the at least one of the plurality of mold cavity and mold core pairs;
   prior to the at least one of the plurality of actuatable mold cavity and mold core pairs being actuated to the open condition, bringing the inlet of the mold cavity of the at least one of the plurality of actuatable mold cavity and mold core pairs out of communication with the respective one of the plurality of inclined feed channels; and
   further advancing the at least one of the plurality of mold cavity and mold core pairs along the continuous cam track until the at least one of the plurality of mold cavity and mold core pairs reaches the first portion of the cam track, thereby opening the at least one of the plurality of mold cavity and mold core pairs.

2. The method of claim 1, and in continuously feeding the supply of molten polymeric material to the nozzle, dividing the molten polymeric material from the nozzle into the plurality of inclined feed channels, the plurality of inclined feed channels including a second one of the plurality of inclined feed channels in communication with a second at least one of the plurality of actuable mold cavity and mold core pairs.

3. The method of claim 1, wherein a sprue is provided intermediate the respective one of the plurality of inclined feed channels and the at least one of the plurality of actuable mold cavity and mold core pairs.

4. The method of claim 1, further comprising rotating the respective one of a plurality of inclined feed channels about the nozzle.

5. The method of claim 1, wherein the second portion of the cam track is disposed in an arcuate arrangement relative to the nozzle.

6. The method of claim 1, wherein the cam track is disposed in a circular arrangement relative to the nozzle.

7. The method of claim 1, and in continuously feeding the supply of molten polymeric material to the nozzle, the continuous feeding includes extrusion of the molten polymeric material.

8. The method of claim 1, further comprising metering the flow of molten polymeric material in to the at least one of the plurality of actuable mold cavity and mold core pairs through one of a metering gate or a controllable valve.

9. The method of claim 1, further comprising cooling the molten polymeric material in the at least one of the plurality of actuable mold cavity and mold core pairs.

10. The method of claim 9, wherein a molded part is ejected from the mold cavity of the at least one of the plurality of actuatable mold cavity and mold core pairs when the at least one of the plurality of actuatable mold cavity and mold core pairs is in the open condition.

11. The method of claim 10, wherein the molded part is ejected after the molten polymeric material in the at least one of the plurality of actuable mold cavity and mold core pairs is cooled.

12. The method of claim 8, and in metering the flow of molten polymeric material in to the at least one of the plurality of actuable mold cavity and mold core pairs, adjusting the metering gate or controllable valve in the respective one of the plurality of inclined feed channels to a different extent than that to which the metering gate or controllable valve in a second one of the plurality of inclined feed channels is adjusted.

* * * * *